(12) United States Patent
Ide

(10) Patent No.: US 9,827,804 B2
(45) Date of Patent: Nov. 28, 2017

(54) DIFFRACTION STRUCTURE TRANSFER FOIL AND FORGERY PREVENTION MEDIUM USING SAME

(71) Applicant: TOPPAN PRINTING CO., LTD., Taito-ku, Tokyo (JP)

(72) Inventor: Hidetaka Ide, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/303,197

(22) PCT Filed: May 13, 2015

(86) PCT No.: PCT/JP2015/002433
§ 371 (c)(1),
(2) Date: Oct. 10, 2016

(87) PCT Pub. No.: WO2015/174089
PCT Pub. Date: Nov. 19, 2015

(65) Prior Publication Data
US 2017/0028762 A1    Feb. 2, 2017

(30) Foreign Application Priority Data
May 13, 2014  (JP) ................................ 2014-099883

(51) Int. Cl.
*B42D 25/373* (2014.01)
*B42D 25/328* (2014.01)
(Continued)

(52) U.S. Cl.
CPC ......... *B42D 25/328* (2014.10); *B42D 25/324* (2014.10); *B42D 25/40* (2014.10); *G02B 5/1814* (2013.01); *G03H 1/02* (2013.01)

(58) Field of Classification Search
CPC .............................. B42D 25/29; B42D 25/328
(Continued)

(56) References Cited

U.S. PATENT DOCUMENTS 4,479,995 A * 10/1984 Suzuki ..................... B44C 3/02
                                                         283/904
4,499,126 A *  2/1985 Suzuki .................... B32B 27/08
                                                         101/487
(Continued)

FOREIGN PATENT DOCUMENTS

JP       S-61-190369 A    8/1986
JP       H-01-54709 B    11/1989
(Continued)

OTHER PUBLICATIONS

International Search Report for Application No. PCT/JP2015/002433, dated Aug. 4, 2015, English translation.
(Continued)

*Primary Examiner* — Shin Kim
(74) *Attorney, Agent, or Firm* — Squire Patton Boggs (US) LLP

(57) ABSTRACT

Provided are diffraction structure transfer foil that further improves usefulness of the diffraction structure transfer foil in authenticity determination by allowing a greater variety of diffracted-light patterns to be observed, and a forgery prevention medium using the diffraction structure transfer foil. The diffraction structure transfer foil (21) includes a transfer foil substrate (1), a peeling-off protective layer (2) that is laminated on one surface of the transfer foil substrate (1), a laminated body for diffracted-light delivery (13a) that is laminated on the peeling-off protective layer (2), and an adhesive layer (9) that is laminated on the laminated body for diffracted-light delivery (13a). The laminated body for diffracted-light delivery (13a) includes a diffraction structure forming body in which a plurality of diffraction struc-
(Continued)

tures (4 and 7) are formed, and a reflective layer (5a or 8a) that is formed in accordance with each of the plurality of diffraction structures (4 and 7). A transmission density of one reflective layer (5a) of the plurality of reflective layers (5a and 8a) is in a range of 0.01 to 0.9, and a transmission density of the other reflective layer (8a) is 1.0 or greater.

18 Claims, 10 Drawing Sheets

(51) Int. Cl.
  G03H 1/02 (2006.01)
  B42D 25/40 (2014.01)
  B42D 25/324 (2014.01)
  G02B 5/18 (2006.01)
(58) Field of Classification Search
  USPC .......................................................... 283/91
  See application file for complete search history.

(56) References Cited

U.S. PATENT DOCUMENTS

| | | | | |
|---|---|---|---|---|
| 7,090,913 | B2* | 8/2006 | Bourdelais | B42D 25/00 283/107 |
| 8,562,025 | B2* | 10/2013 | Drinkwater | B42D 15/025 283/100 |
| 2001/0046630 | A1* | 11/2001 | Toshine | B44C 1/1716 430/1 |
| 2002/0015897 | A1* | 2/2002 | Toshine | G03H 1/0252 430/2 |
| 2007/0085334 | A1* | 4/2007 | Watanabe | B42D 25/364 283/72 |
| 2013/0107335 | A1* | 5/2013 | Holmes | G03H 1/0248 359/2 |
| 2016/0200133 | A1* | 7/2016 | Aigner | B32B 15/08 283/85 |

FOREIGN PATENT DOCUMENTS

| | | |
|---|---|---|
| JP | 4-40256 | 4/1992 |
| JP | 07-199781 A | 8/1995 |
| JP | 10-129107 A | 5/1998 |
| JP | 2006-306085 A | 11/2006 |

OTHER PUBLICATIONS

International Preliminary Report on Patentability dated Nov. 15, 2016 in International Patent Application No. PCT/JP2015/002433, 5 pages.

* cited by examiner

DIFFRACTION STRUCTURE TRANSFER FOIL AND FORGERY PREVENTION MEDIUM USING SAME

TECHNICAL FIELD

The present invention relates to diffraction structure transfer foil and a forgery prevention medium using the same.

BACKGROUND ART

Diffraction structure transfer foil provided with forgery prevention means (forgery prevention unit), and a forgery prevention medium using the same are described, for example, in PTL 1 to PTL 3.

CITATION LIST

Patent Literature

PTL 1: JP 61-190369 A
PTL 2: JP 1-54709 B
PTL 3: JP 7-199781 A

SUMMARY OF INVENTION

Technical Problem

However, in the diffraction structure transfer foil and the forgery prevention medium using the same according to the related art, there is a problem that an authenticity determination may not be easily made.

The invention has been made to solve the problem, and an object thereof is to provide diffraction structure transfer foil capable of easily making an authenticity determination, and a forgery prevention medium using the same. More specifically, an object of the invention is to provide a diffraction structure transfer foil that further improves usefulness of the diffraction structure transfer foil in authenticity determination by allowing a greater variety of diffracted-light patterns to be observed, enables a sense of vision of human beings to grasp characteristics of a high visual effect provided to a diffraction structure without a variation in the visual effect, and allows an authenticity determination to be easily made, and a forgery prevention medium using the diffraction structure transfer foil.

Solution to Problem

According to an aspect of the invention, there is provided diffraction structure transfer foil including a support body, a peeling-off protective layer that is laminated on one surface of the support body, a laminated body for diffracted-light delivery that is laminated on the peeling-off protective layer, and an adhesive layer that is laminated on the laminated body for diffracted-light delivery. The laminated body for diffracted-light delivery includes a diffraction structure forming body in which a plurality of diffraction structures are formed, and a reflective layer that is formed in accordance with each of the plurality of diffraction structures. A transmission density of at least one reflective layer out of a plurality of the reflective layers is in a range of 0.01 to 0.9, and a transmission density of another reflective layer other than the one reflective layer is 1.0 or greater.

Advantageous Effects of Invention

According to the diffraction structure transfer foil according to the aspect of the invention, the transmission density of at least one reflective layer is in a range of 0.01 to 0.9 and has transmission properties, and the transmission density of another reflective layer other than the one reflective layer is 1.0 or greater and hardly has transmission properties. As described above, when using two reflective layers different in transmission properties, it is possible to deliver a greater variety of diffracted-light patterns to an outer side from the diffraction structure transfer foil.

Accordingly, a greater variety of diffracted-light patterns can be observed, and thus usefulness of the diffraction structure transfer foil in authenticity determination is further improved. In addition, it is possible to grasp characteristics of a high visual effect provided to a diffraction structure with a sense of vision of human beings without a variation in the visual effect, and it is possible to easily make an authenticity determination.

DESCRIPTION OF EMBODIMENTS

Figure 1:
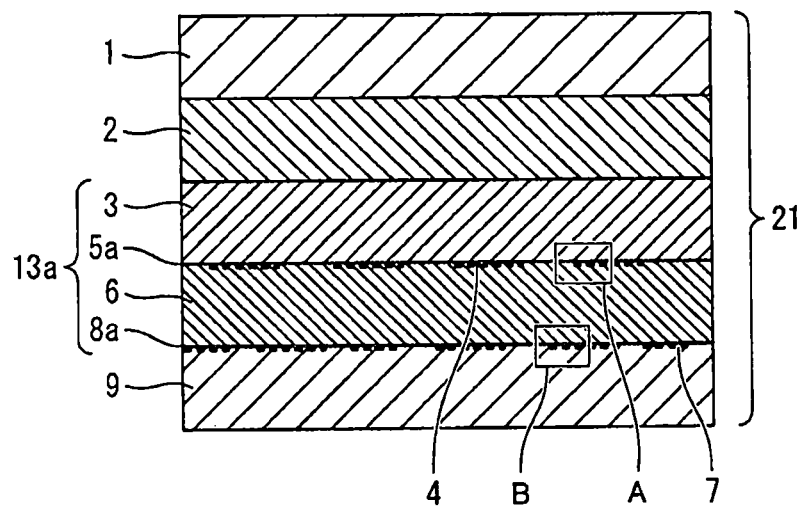
FIG. 1 is a cross-sectional view schematically illustrating a structure of diffraction structure transfer foil according to a first embodiment of the invention.

Hereinafter, detailed description will be given of structures of diffraction structure transfer foil according to an aspect of the invention and a forgery prevention medium using the diffraction structure transfer foil, a diffracted-light delivery angle that is an angle made between an angle of a diffracted light delivered from the diffraction structure transfer foil and a surface of a laminated body for diffraction structure delivery, and the like with reference to the accompanying drawings. The diffracted-light delivery angle is an elevation angle from a surface of the laminated body for diffraction structure delivery. In a case where diffracted light is delivered in a direction parallel to the surface of the laminated body for diffraction structure delivery, the elevation angle becomes 0°, and in a case where diffracted light is delivered in a direction perpendicular to the surface of the laminated body for diffraction structure delivery, the elevation angle becomes 90°. With regard to a wavelength of the diffracted light at this time, light having a wavelength of 550 nm at which visual sensitivity is high is preferable. Furthermore, in the following detailed description, various specific details will be described so as to provide complete comprehension of the embodiment of the invention. However, it should be understood that one or more embodiments can be executed even when the specific details are not present. In addition, a structure and a device, which are known, are illustrated as a schematic drawing for simplification of the drawing. In addition, in respective drawings, the same reference numeral will be given to constituent elements having the same or similar function, and redundant description thereof will be omitted.

(Structure)

First Embodiment

FIG. 1 is a cross-sectional view of diffraction structure transfer foil 21 according to a first embodiment of the invention. The diffraction structure transfer foil 21 includes a transfer foil substrate 1, and a peeling-off protective layer 2, a first diffraction structure forming layer 3, a first reflective layer 5a, a second diffraction structure forming layer 6, a second reflective layer 8a, and an adhesive layer 9 which are laminated on one surface (a surface on a lower side in FIG. 1) of the transfer foil substrate 1 in this order. Relieves 4 and 7, which are obtained due to minute concavity and convexity, are partially formed in the first diffraction structure forming layer 3 and the second diffraction structure forming layer 6 through embossing processing.

That is, the diffraction structure transfer foil 21 includes a support body that is the transfer foil substrate 1, the peeling-off protective layer 2 that is laminated on one surface of the transfer foil substrate 1, a laminated body for diffracted-light delivery 13a which is laminated on the peeling-off protective layer 2, and the adhesive layer 9 that is laminated on the laminated body for diffracted-light delivery 13a. In addition, the laminated body for diffracted-light delivery 13a includes the first diffraction structure forming layer 3 provided with the relief 4, the second diffraction structure forming layer 6 provided with the relief 7 that is formed at a height position different from that of the relief 4 in a lamination direction, and the first and second reflective layers 5a and 8a which are respectively formed in accordance with the relieves 4 and 7. Furthermore, the two relieves 4 and 7 correspond to a plurality of diffraction structures of the invention. In addition, the first diffraction structure forming layer 3 and the second diffraction structure forming layer 6 correspond to a diffraction structure forming body of the invention.

In the first and second reflective layers 5a and 8a which are two reflective layers, a transmission density of the first reflective layer 5a at a position that is closest to the transfer foil substrate 1 is in a range of 0.01 to 0.9, and a transmission density of the second reflective layer 8a at a position that is closest to the adhesive layer 9 is 1.0 or greater.

The laminated body for diffracted-light delivery 13a includes the first diffraction structure forming layer 3 in which a first diffraction structure (relief 4) is formed, the first reflective layer 5a that is laminated on the first diffraction structure forming layer 3 and is formed in accordance with the first diffraction structure, the second diffraction structure forming layer 6 in which a second diffraction structure (relief 7) is formed, and the second reflective layer 8a that is laminated on the second diffraction structure forming layer 6 and is formed in accordance with the second diffraction structure. The first diffraction structure forming layer 3, the first reflective layer 5a, the second diffraction structure forming layer 6, and the second reflective layer 8a are laminated in this order from the transfer foil substrate 1 side.

The diffraction structure is a structure capable of allowing a character, a color, or an image pattern to be observed at an angle in a specific range, or allowing a plurality of different characters, color, or image patterns to be observed in accordance with an observation angle.

Figure 2:
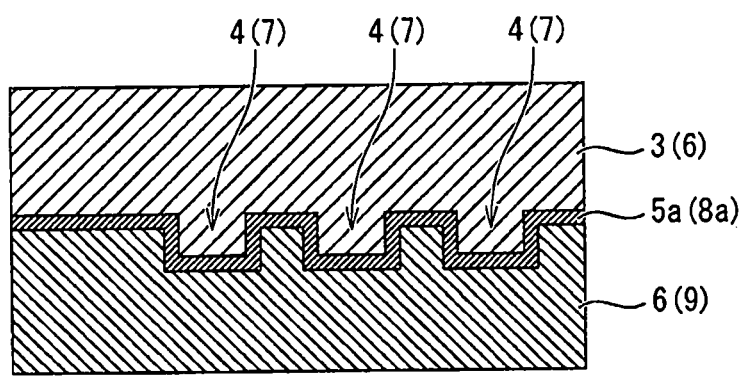
FIG. 2 is an enlarged cross-sectional view of a region A and a region B in the vicinity of an interface between a first diffraction structure forming layer and a second diffraction structure forming layer of the diffraction structure transfer foil according to the first embodiment of the invention.

FIG. 2 is an enlarged view of an A portion (region A) in FIG. 1. The relief 4 is formed in a surface (surface on a lower side in FIG. 2) of the first diffraction structure forming layer 3 on a first reflective layer 5a side, and the first reflective layer 5a is provided between the first diffraction structure forming layer 3 and the second diffraction structure forming layer 6 (at an interface therebetween).

Furthermore, in a B portion (region B) in FIG. 1, as indicated by a symbol in parentheses of FIG. 2, the relief 7 is formed in a surface (a surface on a lower side in FIG. 2) of the second diffraction structure forming layer 6 on a second reflective layer 8a side, and the second reflective layer 8a is provided between the second diffraction structure forming layer 6 and the adhesive layer 9 (at an interface therebetween). As described above, the plurality of diffraction structures are respectively formed in surfaces of the diffraction structure forming layers 3 and 6 on the adhesive layer 9 side.

Second Embodiment

Figure 3:
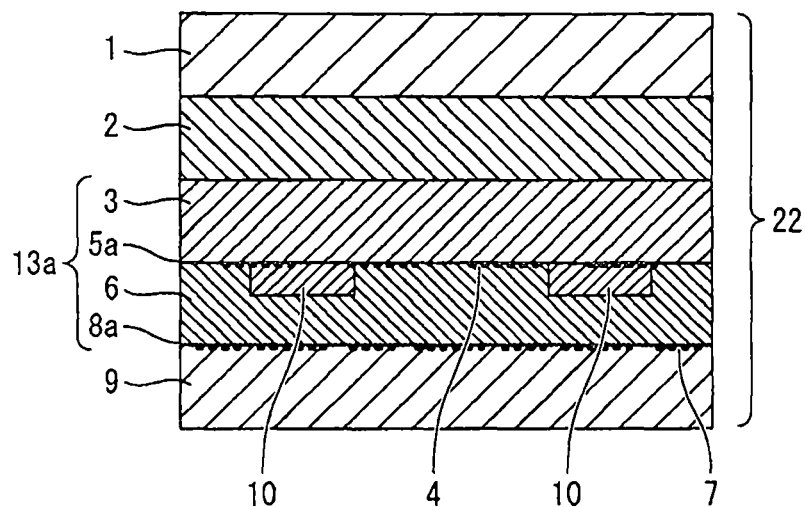
FIG. 3 is a cross-sectional view schematically illustrating a structure of a diffraction structure transfer foil according to a second embodiment of the invention.

FIG. 3 is a cross-sectional view of diffraction structure transfer foil 22 according to a second embodiment of the invention. In the diffraction structure transfer foil 22, a printed layer 10 including a character or an image pattern is formed between the first reflective layer 5a and the second diffraction structure forming layer 6. Furthermore, the other portions are approximately same as in the structure of the diffraction structure transfer foil 21 according to the first embodiment, and thus description thereof will be omitted here.

Third Embodiment

Figure 4:
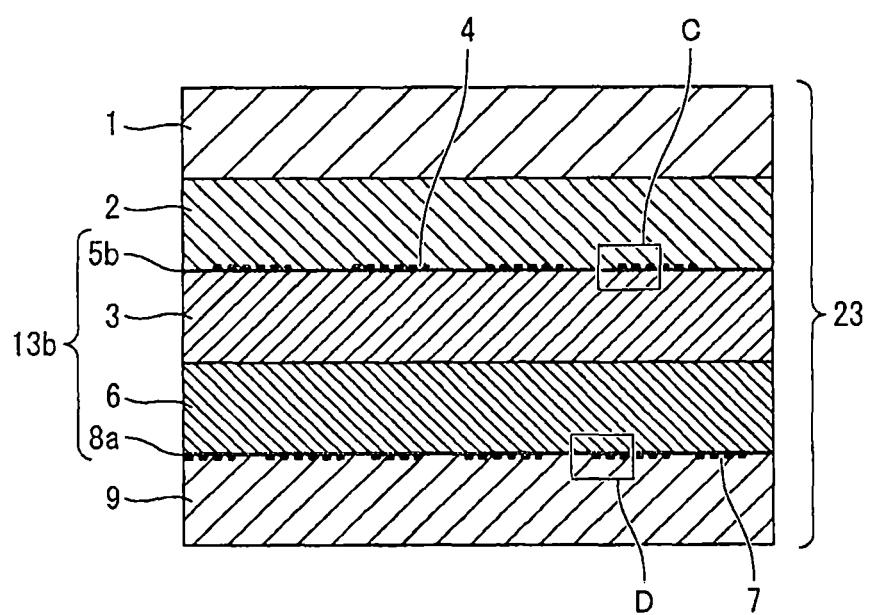
FIG. 4 is a cross-sectional view schematically illustrating a structure of a diffraction structure transfer foil according to a third embodiment of the invention.

FIG. 4 is a cross-sectional view of a diffraction structure transfer foil 23 according to a third embodiment of the invention. In the diffraction structure transfer foil 23, the relief 4 and the first reflective layer 5a in FIG. 1 are provided in a surface of the first diffraction structure forming layer 3 on a peeling-off protective layer 2 side.

That is, in the diffraction structure transfer foil 23 according to the third embodiment, a laminated body for diffracted-light delivery 13b includes a first diffraction structure forming layer 3 in which a first diffraction structure is formed, a first reflective layer 5b that is laminated on the first diffraction structure forming layer 3 and is formed in accordance with the first diffraction structure, a second diffraction structure forming layer 6 in which a second diffraction structure is formed, and a second reflective layer 8a that is laminated on the second diffraction structure forming layer 6 and is formed in accordance with the second diffraction structure. The first reflective layer 5b, the first diffraction structure forming layer 3, the second diffraction structure forming layer 6, and the second reflective layer 8a are laminated in this order from the transfer foil substrate 1 side.

Figure 5:
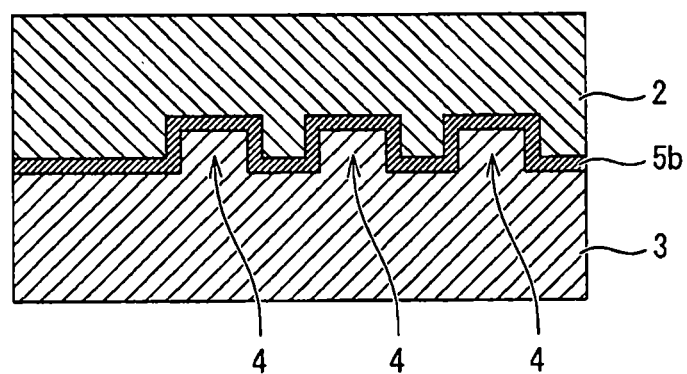
FIG. 5 is an enlarged cross-sectional view of a region C in the vicinity of an interface between a first diffraction structure forming layer and a second diffraction structure forming layer of the diffraction structure transfer foil according to the third embodiment of the invention.
Figure 6:
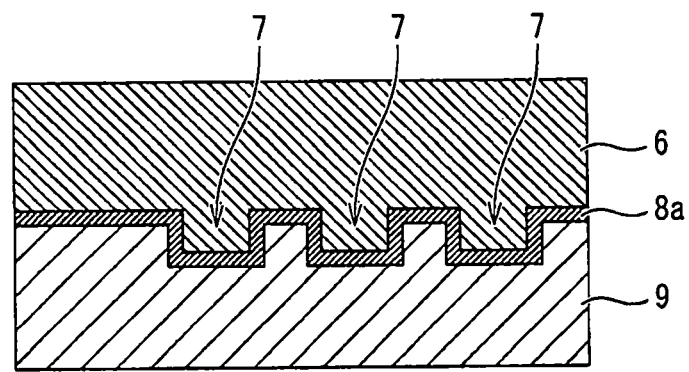
FIG. 6 is an enlarged cross-sectional view of a region D in the vicinity of the interface between the first diffraction structure forming layer and the second diffraction structure forming layer of the diffraction structure transfer foil according to the third embodiment of the invention.

An enlarged view of a C portion (region C) of FIG. 4 is illustrated in FIG. 5, and an enlarged view of a D portion (region D) of FIG. 4 is illustrated in FIG. 6. In FIG. 5, the relief 4 is formed in a surface of the first diffraction structure forming layer 3 (surface on an upper side in FIG. 5) on a peeling-off protective layer 2 side, and the first reflective layer 5b is provided between the first diffraction structure forming layer 3 and the peeling-off protective layer 2 (at an interface therebetween). In addition, in FIG. 6, the relief 7 is formed in a surface (surface on a lower side in FIG. 6) of the second diffraction structure forming layer 6 on an adhesive layer 9 side, and the second reflective layer 8a is provided between the second diffraction structure forming layer 6 and the adhesive layer 9 (at an interface therebetween).

Fourth Embodiment

Figure 7:
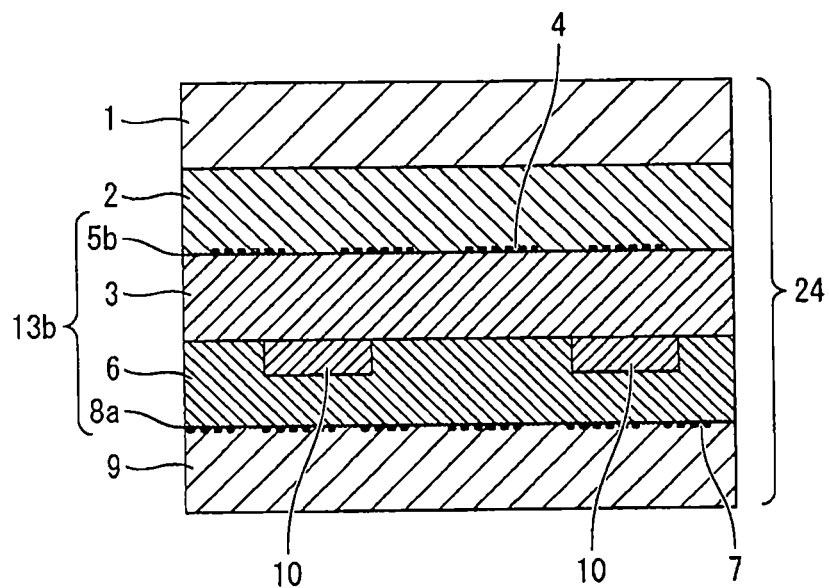
FIG. 7 is a cross-sectional view schematically illustrating a structure of a diffraction structure transfer foil according to a fourth embodiment of the invention.

FIG. 7 is a cross-sectional view of a diffraction structure transfer foil 24 according to a fourth embodiment of the invention. In the diffraction structure transfer foil 24, a printed layer 10 including a character or an image pattern is formed between the first diffraction structure forming layer 3 and the second diffraction structure forming layer 6. Furthermore, the other portions are approximately same as the structure of the diffraction structure transfer foil 23 according to the third embodiment, and thus description thereof will be omitted here.

Fifth Embodiment

Figure 8:
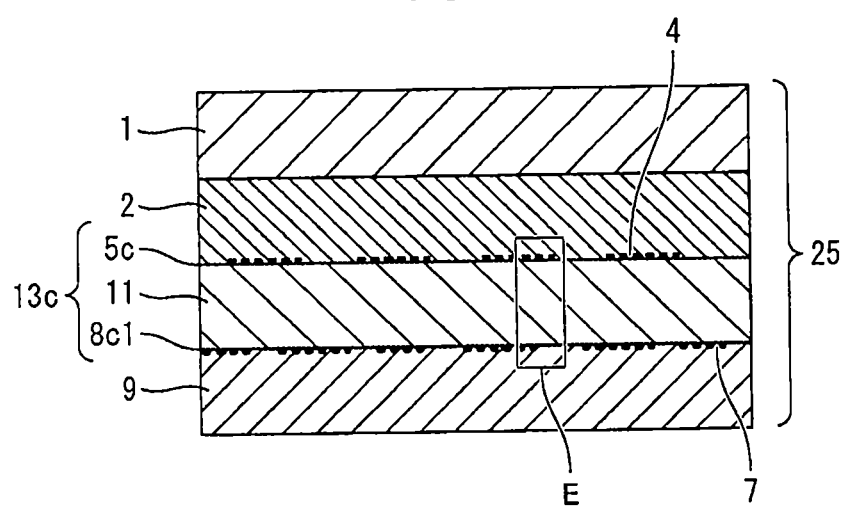
FIG. 8 is a cross-sectional view schematically illustrating a structure of a diffraction structure transfer foil according to a fifth embodiment of the invention.

FIG. 8 is a cross-sectional view of diffraction structure transfer foil 25 according to a fifth embodiment of the invention. The diffraction structure transfer foil 25 is not provided with the second diffraction structure forming layer 6 described in the first to fourth embodiments. That is, the diffraction structure transfer foil 25 includes a double-sided diffraction structure forming layer 11 in which a relief 4 and a relief 7, which have a diffraction structure, are formed in both surfaces (an upper surface and a lower surface in an upper and lower direction in FIG. 8) instead of the first diffraction structure forming layer 3. At least five layers including a peeling-off protective layer 2, a first reflective layer 5 (5c), the double-sided diffraction structure forming layer 11, a second reflective layer 8 (8c1), and an adhesive layer 9 are laminated in this order on one surface of a transfer foil substrate 1.

That is, in the diffraction structure transfer foil 25 according to the fifth embodiment, a laminated body for diffracted-light delivery 13c includes the double-sided diffraction structure forming layer 11 in which a first diffraction structure is formed in a surface on a transfer foil substrate 1 side, and a second diffraction structure is formed in a surface on an adhesive layer 9 side, the first reflective layer 5c that is formed in accordance with the first diffraction structure, and the second reflective layer 8c1 that is formed in accordance with the second diffraction structure. The first reflective layer 5c, the double-sided diffraction structure forming layer 11, and the second reflective layer 8c1 are laminated in this order from a transfer foil substrate 1 side. Furthermore, the double-sided diffraction structure forming layer 11 corresponds to the diffraction structure forming body of the invention.

Figure 9:
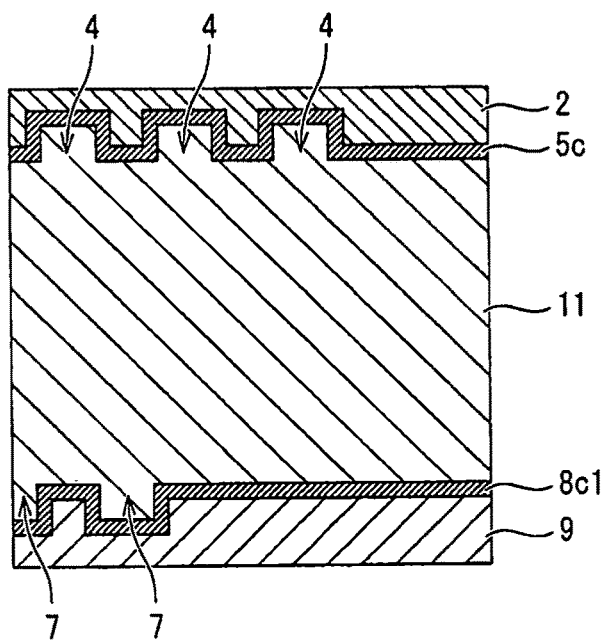
FIG. 9 is an enlarged cross-sectional view of a region E in the vicinity of a double-sided diffraction structure forming layer of the diffraction structure transfer foil according to the fifth embodiment of the invention.

FIG. 9 is an enlarged view of an E portion (region E) in FIG. 8. The relief 4 is formed in a surface (a surface on an upper side in FIG. 9) of the double-sided diffraction structure forming layer 11 on a peeling-off protective layer 2 side, and the first reflective layer 5c is provided between the peeling-off protective layer 2 and the double-sided diffraction structure forming layer 11 (at an interface therebetween). On the other hand, the relief 7 is formed in a surface (a surface on a lower side in FIG. 9) of the double-sided diffraction structure forming layer 11 on an adhesive layer 9 side, and the second reflective layer 8c1 is provided between the adhesive layer 9 and the double-sided diffraction structure forming layer 11 (at the entirety of an interface therebetween).

Sixth Embodiment

Diffraction structure transfer foil according to a sixth embodiment of the invention has a configuration in which at least one reflective layer of the first reflective layer 5c and the second reflective layer 8c1 in the diffraction structure transfer foil 25 illustrated in FIG. 8 is partially provided between two layers with the one reflective layer interposed in a lamination direction instead of the entire region (the entirety of an interface).

Figure 10:
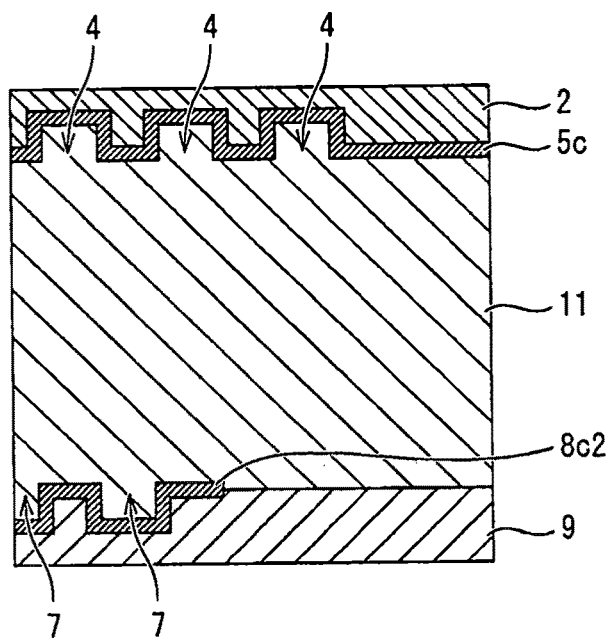
FIG. 10 is an enlarged cross-sectional view of the vicinity of a double-sided diffraction structure forming layer of a diffraction structure transfer foil according to a sixth embodiment of the invention.

FIG. 10 is an enlarged cross-sectional view illustrating a portion corresponding to the E portion (region E) of FIG. 8 in the diffraction structure transfer foil according to the sixth embodiment of the invention. In FIG. 10, the first reflective layer 5c of the diffraction structure transfer foil 25 in FIG. 9 is provided in the entire region (at the entirety of the interface) between the peeling-off protective layer 2 and the double-sided diffraction structure forming layer 11, and the second reflective layer 8c2 is provided partially between the adhesive layer 9 and the double-sided diffraction structure forming layer 11 instead of the entire region (at the entirety of the interface).

Specifically, the second reflective layer 8c2 is provided only in a region shown on a left side in FIG. 10 between the adhesive layer 9 and the double-sided diffraction structure forming layer 11 (at an interface therebetween), and is not provided in a region shown on a right side between the adhesive layer 9 and the double-sided diffraction structure forming layer 11 (at an interface therebetween).

Figure 11:
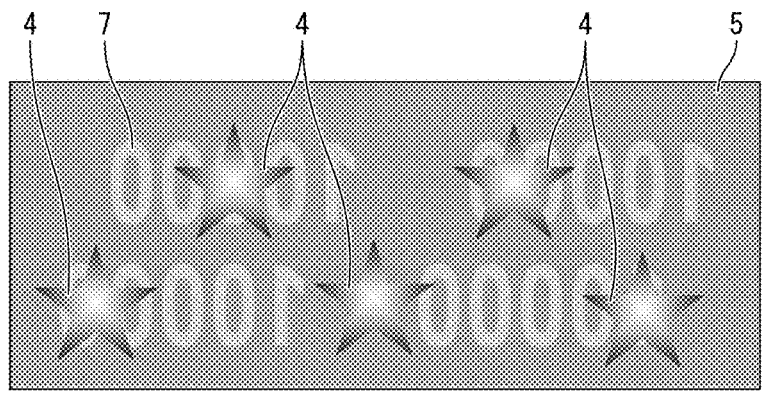
FIG. 11 is a schematic view when a front surface is seen in a plan view in a state in which a substrate surface side in the diffraction structure transfer foil according to each of the first, third, fifth, and sixth embodiments of the invention is set as the front surface.

FIG. 11 is a plan view when observing the diffraction structure transfer foil illustrated in the first embodiment, the third embodiment, the fifth embodiment, or the sixth embodiment of the invention from a transfer foil substrate 1 side (front surface side) under front light. The relief 4 having a "☆" (star)-pattern is provided in the first diffraction structure forming layer 3, and the first reflective layer 5 (5a, 5b, or 5c), of which a transmission density is in a range of 0.01 to 0.9, is provided in the entire region (at the entirety of the interface) between two layers with the first reflective layer 5 interposed therebetween. In addition, the second reflective layer 8 (8a, 8b, 8c1, or 8c2) of which a transmission density is 1.0 or greater is also provided in the entire region (at the entirety of the interface) between two layers with the second reflective layer 8 interposed therebetween.

As described above, a visible-light transmission density of the first reflective layer 5 is set to be lower than a visible-light transmission density of the second reflective layer 8. In addition, the relief 7 including a character pattern of "10000" can be observed over the first reflective layer 5 although not clear. Five relieves 4 having the ☆-pattern and four character patterns of "10000" in FIG. 11 are observed in a partially overlapping manner. In the diffraction structure transfer foil, the first diffraction structure and the second diffraction structure are formed in an arrangement in which at least parts thereof overlap in a lamination direction so that the overlapping is capable of being observed.

Furthermore, in FIG. 11, reference numerals of the transfer foil substrate 1, the peeling-off protective layer 2, and the first diffraction structure forming layer 3 are omitted for explanation. In addition, the transmission density represents an optical density that is measured as the percentage of transmitted light for incident light with respect to a film, printing paper, and the like.

Figure 12:
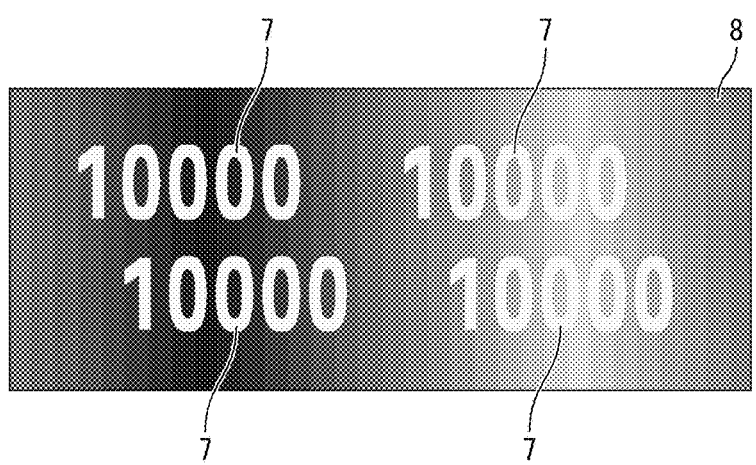
FIG. 12 is a schematic view when a rear surface is seen in a plan view in a state in which the substrate surface side in the diffraction structure transfer foil according to each of the first, third, fifth, and sixth embodiments of the invention is set as the front surface.

On the other hand, FIG. 12 is a plan view illustrating an aspect when observing the diffraction structure transfer foil illustrated in FIG. 11 from an adhesive layer 9 side (rear surface side) under front light. The second reflective layer 8 of which a transmission density is 1.0 or greater is provided in the entire region (at the entirety of the interface) between two layers with the second reflective layer 8 interposed therebetween. According to this, the ☆-pattern as the relief 4, which is located on a deep side in a visual line in observation from the second reflective layer 8, is not observed. Furthermore, the characters of "10000" as the relief 7, and a diffracted-light pattern can be observed. Furthermore, in FIG. 12, a reference numeral of the adhesive layer 9 is omitted for explanation.

Seventh Embodiment

Figure 13:
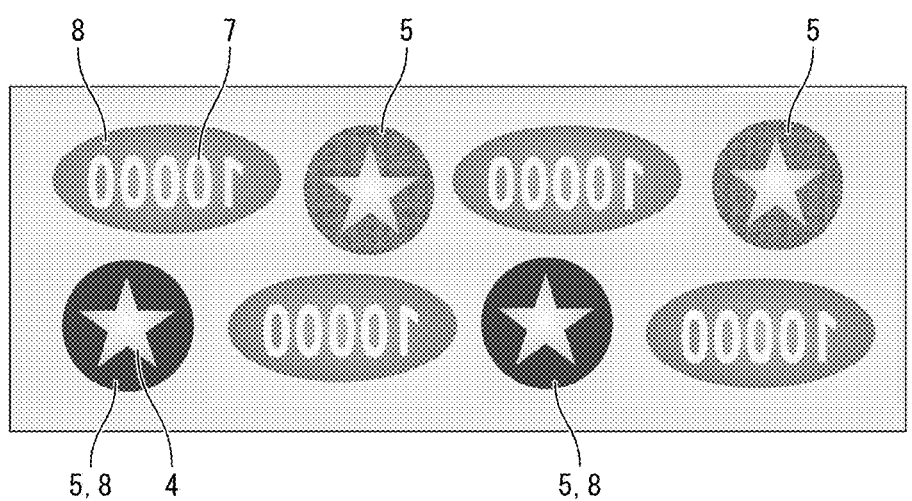
FIG. 13 is a plan view when observing a front surface under front light in a state in which a substrate surface side in a diffraction structure transfer foil according to a seventh embodiment of the invention is set as the front surface.

Next, FIG. 13 is a view illustrating a diffraction structure transfer foil according to a seventh embodiment of the invention. Furthermore, in FIG. 13, reference numerals of the transfer foil substrate 1, the peeling-off protective layer 2, and the first diffraction structure forming layer 3 are omitted for explanation. In the diffraction structure transfer foil according to the seventh embodiment, as is the case with the second reflective layer 8 of the diffraction structure transfer foil of the sixth embodiment, the first reflective layer 5 is partially provided between two layers with the first reflective layer 5 interposed therebetween instead of the entire region (the entirety of the interface). In addition, the second reflective layer 8 is also partially provided between two layers with the second reflective layer 8 interposed therebetween instead of the entire region (the entirety of the interface). That is, at least one reflective layer of the first reflective layer 5 and the second reflective layer 8 is partially provided between two layers with the one reflective layer interposed therebetween.

FIG. 13 is a plan view illustrating an aspect when observing the diffraction structure transfer foil according to the seventh embodiment from a front surface side under front light. In the first diffraction structure forming layer 3 or the double-sided diffraction structure forming layer 11, four ☆-patterns as the relief 4 are provided to be respectively located on an inner side of four first reflective layers 5 having an O-shape (perfect circle shape) one by one. The entirety of an inner side of an O-shaped region is the first reflective layer 5, and a transmission density thereof is set to a range of 0.01 to 0.9. In addition, the second reflective layer 8 of which a transmission density is 1.0 or greater includes four elliptical shapes and two O-shapes having the same shape as the O-shape of the first reflective layer 5. The four elliptical shapes are formed at positions which do not overlap with the four O-shapes of the first reflective layer 5, and the two O-shapes of second reflective layer 8 are formed to be aligned to two O-shapes on a lower stage side among the O-shapes of the first reflective layer 5 which are formed in two stages on an upper side and on a lower side in FIG. 13.

That is, as illustrated in FIG. 13, the first reflective layer 5 includes O-shapes which are formed two by two on an upper stage and a lower stage of the diffraction structure transfer foil having a rectangular shape that is longer horizontally. In addition, the second reflective layer 8 includes two O-shapes which are formed at the lower stage of the diffraction structure transfer foil. The two O-shapes of the second reflective layer 8 are formed at positions which overlap with the two O-shapes of the first reflective layer 5, which are formed on the lower stage, in a lamination direction. In addition, as an additional second reflective layer 8, elliptical shapes are further formed two by two on the upper stage and on the lower stage of the diffraction structure transfer foil. As described above, the first reflective layer 5 and the second reflective layer 8 are formed in an alignment of at least partially overlapping in a lamination direction.

In addition, the characters of "10000" as the relief 7 are formed on an inner side of the second reflective layer 8 having an elliptical shape.

Accordingly, in the ☆-patterns obtained by reflected light and diffracted light of the relief 4, the ☆-pattern on the lower stage side is capable of being observed in a state in which contrast is more satisfactory than contrast on the upper stage side because a reflectance on the lower stage side, in which the O-shape of the first reflective layer 5 and the O-shape of the second reflective layer 8 are provided to overlap each other at the same position, is higher than a reflectance on the upper stage side. In addition, the characters of "10000" as the relief 7 provided on an inner side of the second reflective layer 8 having an elliptical shape is observed from a front surface side, and thus the characters of "10000" is visually recognized as a horizontally inverted character.

Figure 14:
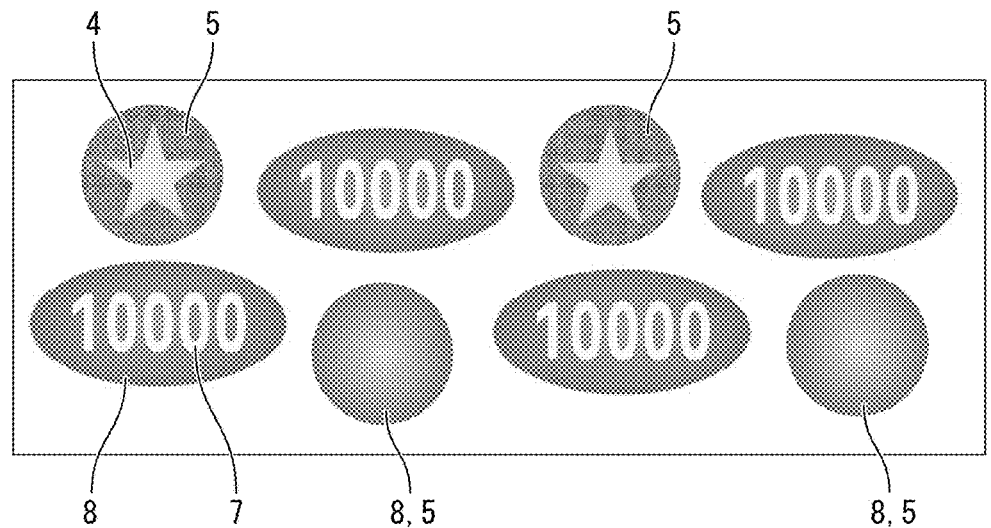
FIG. 14 is a plan view when observing a rear surface under front light in a state in which the substrate surface side in the diffraction structure transfer foil according to the seventh embodiment of the invention is set as the front surface.

Next, FIG. 14 is a plan view when observing the diffraction structure transfer foil illustrated in FIG. 13 from a rear surface side under front light. As illustrated in FIG. 14, with regard to two O-shapes on a lower stage side among the four O-shapes formed in two stages on an upper side and on a lower side as the first reflective layer 5, the two O-shapes of the second reflective layer 8 are located on a more front side in a visual line direction during observation in comparison to the two O-shapes of the first reflective layer 5 on a lower stage side, and are provided to overlap the two O-shapes of the first reflective layer 5 on a lower stage side in the lamination direction. Accordingly, the reflected light or diffracted light, which is visually recognized within the O-shapes on an upper stage, having the star shape as the relief 4 is shielded on a lower stage by the second reflective layer 8 of which a transmission density is 1.0 or greater, and is not observed. Furthermore, when being observed from a rear surface, the characters of "10000" as the relief 7, which is provided on an inner side of the second reflective layer 8 having an elliptical shape, is visually recognized in a facing direction. In addition, in FIG. 14, a reference numeral of the adhesive layer 9 is omitted for explanation.

Figure 15:
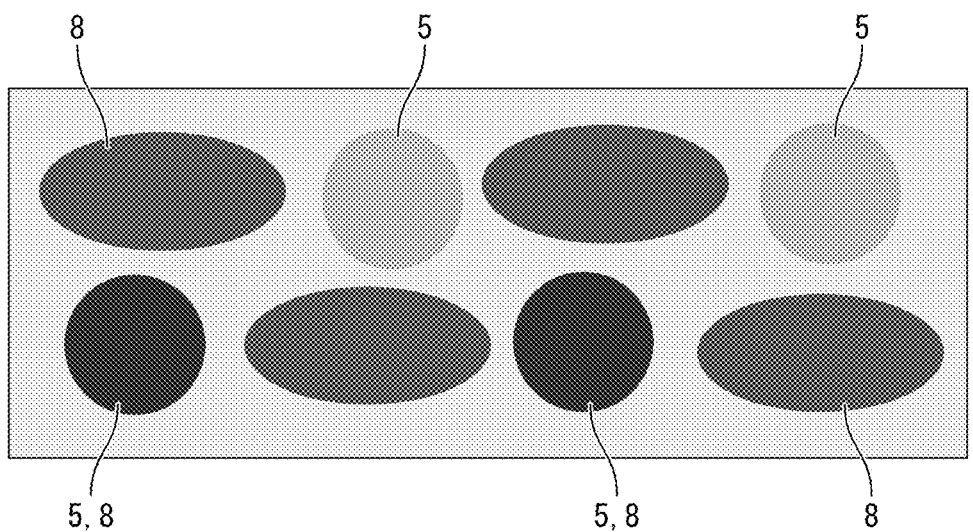
FIG. 15 is a plan view when observing the front surface under back light in a state in which the substrate surface side in the diffraction structure transfer foil according to the seventh embodiment of the invention is set as the front surface.

Next, FIG. 15 is a plan view illustrating an aspect when observing the diffraction structure transfer foil illustrated in FIGS. 13 and 14 from a front surface side with transmitted light under back light in which a light source is disposed on a rear side of the diffraction structure transfer foil. As illustrated in a region other than an O-shape and an elliptical shape in FIG. 15, a portion, in which the first reflective layer 5 and the second reflective layer 8 do not exist, is shown through and becomes white (lightest in FIG. 15). In addition, in an O-shaped portion on an upper stage with only the first reflective layer 5, a visible-light transmission density is in a range of 0.01 to 0.9, and thus visible light is transmitted through the O-shaped portion in the range. Accordingly, the O-shaped portion is observed with a gray color (intermediate dense in FIG. 15). Furthermore, four elliptical portions as the second reflective layer 8, and two O-shaped portions on a lower stage are observed to be dark (most densely in FIG. 15) because a transmission density is 1.0 or greater and transmitted light is almost shielded. Furthermore, reflected light or diffracted light due to the relief 4 or the relief 7 are not observed under the back light.

Figure 16:
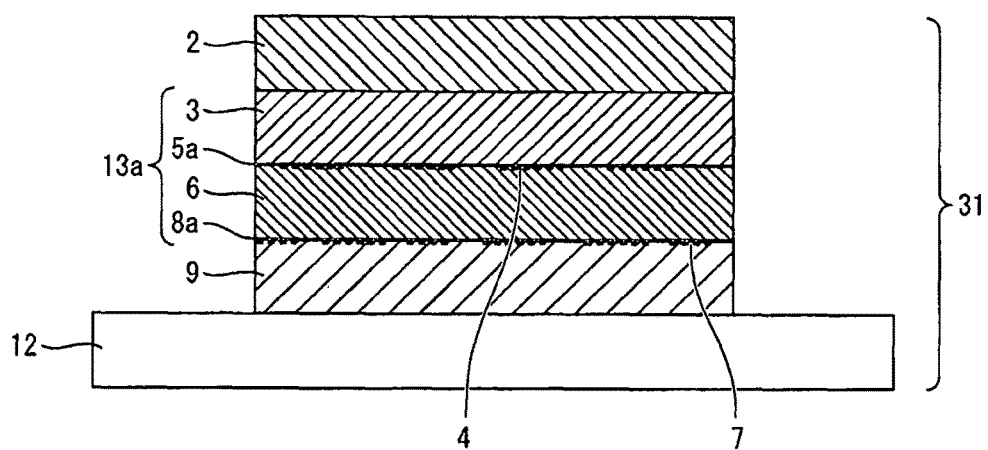
FIG. 16 is a cross-sectional view schematically illustrating a structure of a forgery prevention medium using a diffraction structure transfer foil according to a first example of the invention.

Next, FIG. 16 is a cross-sectional view illustrating a first example of a forgery prevention medium using the diffraction structure transfer foil according to the embodiments of the invention. A forgery prevention medium 31 illustrated in FIG. 16 is manufactured as follows. That is, after the diffraction structure transfer foil 21 illustrated in the first embodiment of the invention is transferred to a substrate 12 to be transferred in which at least a part is transparent, and the transfer foil substrate 1, which is a support body of the diffraction structure transfer foil 21, is peeled off.

Figure 17:
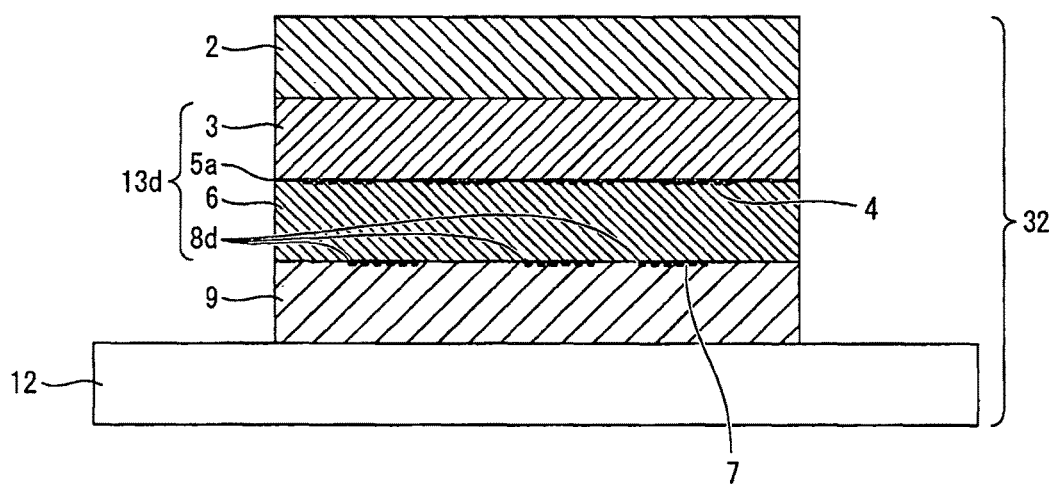
FIG. 17 is a cross-sectional view schematically illustrating a structure of a forgery prevention medium using a diffraction structure transfer foil according to a second example of the invention.

Next, FIG. 17 is a cross-sectional view illustrating a second example of the forgery prevention medium using the diffraction structure transfer foil according to the embodiments of the invention. In diffraction structure transfer foil of a forgery prevention medium 32 according to the second example of the invention, the reflective layer 5a in the diffraction structure transfer foil 21 illustrated in the first embodiment of the invention is formed in the entire region between the first diffraction structure forming layer 3 and the second diffraction structure forming layer 6 (at the entirety of the interface), and a second reflective layer 8d is partially formed between the second diffraction structure forming layer 6 and the adhesive layer 9 (at an interface therebetween). Specifically, three second reflective layers 8d are formed between the second diffraction structure forming layer 6 and the adhesive layer 9 (at an interface therebetween) in a horizontal direction in the drawing as illustrated in FIG. 17.

That is, a laminated body for diffracted-light delivery 13d of the diffraction structure transfer foil includes the first diffraction structure forming layer 3 in which the relief 4 is formed, the first reflective layer 5a that is laminated on the first diffraction structure forming layer 3 and is formed in accordance with the relief 4, the second diffraction structure forming layer 6 in which the relief 7 is formed, and the second reflective layer 8d that is laminated on the second diffraction structure forming layer 6 and is formed in accordance with the relief 7.

The forgery prevention medium 32 according to the second example of the invention is manufactured as follows. That is, after the diffraction structure transfer foil is transferred to the substrate 12 to be transferred, the transfer foil substrate 1 is peeled off.

Figure 18:
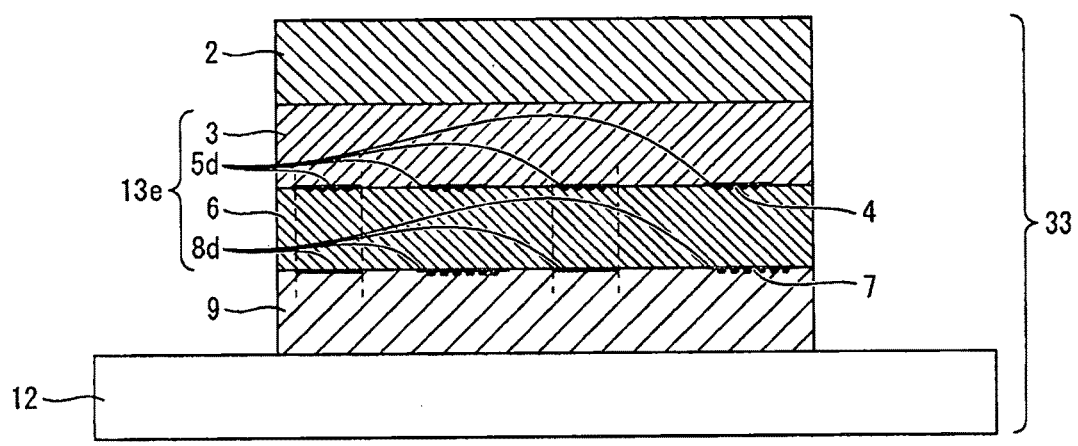
FIG. 18 is a cross-sectional view schematically illustrating a structure of a forgery prevention medium using a diffraction structure transfer foil according to a third example of the invention.

Next, FIG. 18 is a cross-sectional view illustrating a third example of the forgery prevention medium using the diffraction structure transfer foil according to the embodiments of the invention. In the diffraction structure transfer foil of the forgery prevention medium 33 according to the third example of the invention, the reflective layer 5a in the diffraction structure transfer foil 21 illustrated in the first embodiment of the invention is partially formed between the first diffraction structure forming layer 3 and the second diffraction structure forming layer 6 (at an interface therebetween), and the second reflective layer 8d is partially formed between the second diffraction structure forming layer 6 and the adhesive layer 9 (at an interface therebetween).

Specifically, as illustrated in FIG. 18, with regard to a first reflective layer 5d, four first reflective layers 5d are formed between the first diffraction structure forming layer 3 and the second diffraction structure forming layer 6 (at an interface therebetween) in a horizontal direction in the drawing. In addition, as illustrated in FIG. 18, with regard to the second reflective layer 8d, four second reflective layers 8d are formed between the second diffraction structure forming layer 6 and the adhesive layer 9 (at an interface therebetween) in a horizontal direction in the drawing. As illustrated by a dotted line in FIG. 18, the first reflective layer 5d located on the most left side in the drawing among the four first reflective layers 5d, and the second reflective layer 8d located on the most left side in the drawing among the four second reflective layers 8d are formed in such a manner that respective formed regions indicated by a horizontal width in FIG. 18 overlap each other in a lamination direction. In addition, the first reflective layer 5d located in the third from the left in the drawing among the four first reflective layers 5d, and the second reflective layer 8d located in the third from the left in the drawing among the four second reflective layers 8d are also formed in such a manner that respective formed regions overlap each other in the lamination direction.

On the other hand, the first reflective layer 5d located on the most right side in the drawing among the four first reflective layers 5d, and the second reflective layer 8d located on the most right side in the drawing among the four second reflective layers 8d are formed in such a manner that parts of respective formed regions indicated by a horizontal width in FIG. 18 overlap each other in the lamination direction. In addition, the first reflective layer 5d located in the third from the right among the four first reflective layers 5d, and the second reflective layer 8d located in the third from the right among the four second reflective layers 8d are also disposed in such a manner that parts of formed regions overlap each other in the lamination direction.

That is, a laminated body for diffracted-light delivery 13e of the diffraction structure transfer foil includes the first diffraction structure forming layer 3 in which the relief 4 is formed, the first reflective layer 5d that is laminated on the first diffraction structure forming layer 3 and is formed in accordance with the relief 4, the second diffraction structure forming layer 6 in which the relief 7 is formed, and the second reflective layer 8d that is laminated on the second diffraction structure forming layer 6 and is formed in accordance with the relief 7.

The forgery prevention medium 33 according to the third example of the invention is manufactured as follows. That is, after the diffraction structure transfer foil is transferred to the substrate 12 to be transferred, the transfer foil substrate 1, which is a support body of the diffraction structure transfer foil, is peeled off.

Furthermore, although not illustrated in the drawings, even in an arbitrary diffraction structure transfer foil other than the first embodiment of the invention, the forgery prevention medium can be manufactured as follows. That is, after the diffraction structure transfer foil is transferred while including a transparent portion of the substrate 12 to be transferred which has a transparent portion at least at a part thereof, the transfer foil substrate 1 is peeled off.

Hereinafter, the configuration of the diffraction structure transfer foil according to each of the embodiments of the invention, and the forgery prevention medium using the diffraction structure transfer foil will be described in more detail.

(Substrate)

As the transfer foil substrate 1 that is a support body of the diffraction structure transfer foil, a transparent resin film is appropriate, and a polyethylene terephthalate resin film, a polyethylene naphthalate resin film, a polyimide resin film, a polyethylene resin film, a polypropylene resin film, a heat-resistant polyvinyl chloride film, and the like can be used as an example. Among the resins, the polyethylene terephthalate resin film can be preferably used when considering that heat resistance is high and a thickness becomes stable.

In addition, as the substrate 12 to be transferred for transferring of the diffraction structure transfer foil, for example, materials such as an elementary substance of a resin, a laminated body thereof, a composite elementary substance of paper or a resin, and a laminated body thereof can be used as long as the diffraction structure transfer foil is capable of being transferred thereto. In the embodiments, it is necessary for the diffraction structure transfer foil to be observed from both front and rear surfaces of the substrate 12 to be transferred. According to this, as the substrate 12 to be transferred, a transparent resin film is appropriate. In a case of paper or synthetic paper which is not transparent, multi-layer paper in which at least a part of a site to which the diffraction structure transfer foil is transferred is transparent, for example, paper, in which a transparent film is fed into a paper layer to provide a transparent window portion without the paper layer and a transparent film portion is exposed, and the like are used.

(Peeling-Off Protective Layer)

In the diffraction structure transfer foil according to each of the first to seventh embodiments of the invention, the peeling-off protective layer 2 is laminated on one surface of the transfer foil substrate 1. For example, a material obtained by adding a lubricant to a resin can be used as the peeling-off protective layer 2. In addition, as the resin, for example, a thermoplastic resin, a thermosetting resin, a moisture-curable resin, an ultraviolet-curable resin, an electron beam-curable resin, and the like can be used. Specific examples of the resin include an acrylic resin, a polyester resin, and a polyamideimide resin. In addition, as the lubricant, for example, a polyethylene powder, and wax such as CARNAUBA WAX can be used. For example, the lubricant is formed by a known application method such as a gravure printing method and a micro-gravure method.

(Diffraction Structure Forming Layer)

The first diffraction structure forming layer 3 is laminated on the peeling-off protective layer 2. In addition, lamination of the second diffraction structure forming layer 6 is performed after forming the first reflective layer 5. In addition, the diffraction structure forming layer can be manufactured as follows. A peeling-off layer is provided on a separate support body in advance, lamination of the second diffraction structure forming layer 6 is performed, the relief 4 is formed, and the second reflective layer is additionally formed. Then, the adhesive layer 9 is provided, and the resultant laminated body is transferred to an original plate, in which components including the first reflective layer 5 are formed, in the middle of preparation, and then the support body is peeled off.

Examples of a resin that can be used include a thermoplastic resin, a thermosetting resin, an ultraviolet or electron beam-curable resin, and the like. Specific examples of the thermoplastic resin include an acrylic resin, an epoxy-based resin, a cellulose-based resin, a vinyl-based resin, and the like. In addition, for example, a cross-linked urethane resin obtained by adding polyisocynate, as a crosslinking agent, to acrylic polyol, polyester polyol, and the like which have a reactive hydroxyl group, a melamine-based resin, a phenolic resin, and the like can be used. In addition, as the ultraviolet or electron beam-curable resin, for example, epoxy (meth)acrylate, urethane (meth)acrylate, and the like can be used. In addition, the diffraction structure forming layer is formed by a known application method such as a gravure printing method and a micro-gravure method by using the materials as a main material.

The relief 4 and the relief 7 which are formed at a part or at the entirety of a surface of the first diffraction structure forming layer 3 or the second diffraction structure forming layer 6 have a minute concavo-convex structure, and a relief plate is used to form the minute concavo-convex structure. The relief plate is prepared as follows. For example, first, a surface of an electron beam-curable resin is irradiated with electron beams to expose the surface in a desired pattern, and is developed to prepare a master plate. Continuously, a metallic film is formed on a surface of the master plate by electroplating method and the concavo-convex pattern of the master plate is duplicated to the metallic film. According to this, the relief plate is manufactured. In addition, for example, the relief 4 and the relief 7, which include a minute concavo-convex structure, are formed in a surface of the first diffraction structure forming layer 3 or the second diffraction structure forming layer 6 by thermally compressing the relief plate to the first diffraction structure forming layer 3 or the second diffraction structure forming layer 6, or by curing an uncured curable resin while bringing the relief plate into close contact with the uncured curable resin.

Furthermore, with regard to the resin material in the first diffraction structure forming layer 3 or the second diffraction structure forming layer 6 according to the embodiments of the invention, and a method of forming the relief 4 and the relief 7, a known method can be used, and there is no particular limitation to the above-described method. In addition, the case of the first diffraction structure forming layer 3 or the second diffraction structure forming layer 6 is also true of preparation of the double-sided diffraction structure forming layer 11.

Furthermore, the diffraction structure forming body may be configured as a diffraction structure forming layer of three or greater layers. In addition, three or greater diffraction structures, which are different in a height position in the lamination direction, may be formed in the laminated body for diffracted-light delivery.

(Reflective Layer)

Next, it is preferable that the first reflective layer 5 and the second reflective layer 8 are metallic thin film formed by using a vacuum film formation method so as to form a thin film, which has a function of reflecting visible light, on a surface layer of the first diffraction structure forming layer 3 or the second diffraction structure forming layer 6 without burying the minute concavity and convexity of the relief 4 and the relief 7. Examples of a metal that is used in the first reflective layer 5 or the second reflective layer 8 include, Al, Sn, Cr, Ni, Cu, Au, and the like. In addition, as the vacuum film formation method, for example, a vacuum deposition method, a sputtering method, and the like are applicable. In addition, the thickness of the metallic thin film may be controlled in a range of 5 nm to 100 nm. In the embodiments of the invention, a difference in a visible-light transmission density between the two reflective layers is used. Accordingly, for example, in a case of forming the reflective layers with aluminum, it is preferable that the film thickness of the first reflective layer 5 is in a range of 5 nm to 20 nm, and the film thickness of the second reflective layer 8 is 40 nm or greater. In a case where the thickness of the first reflective layer 5 is smaller than 5 nm, the visible-light transmission density is too low, and thus it is difficult to expect the function of the relief 4 or the relief 7 as a reflective layer. In addition, in a case where the thickness of the first reflective layer 5 is larger than 20 nm, the visible-light transmission density is too high, and thus visible light is hardly transmitted through the first reflective layer 5. As a result, it is difficult to perform an observation through the second reflective layer 8 located on a lower layer in comparison to the first reflective layer 5. In addition, it is necessary for the second reflective layer 8 to have high visible-light transmission density. Accordingly, in a case where the film thickness of the first reflective layer 5 is in a range of 5 nm to 20 nm, a thickness of 40 nm or greater is preferable.

Furthermore, the above-described film thickness is an example in a case of forming the thin film with aluminum, and a relationship between the visible-light transmission density and the film thickness varies in accordance with a material of the reflective layers, a film formation method, and the like.

In addition, the first reflective layer 5 and the second reflective layer 8 can be partially removed in an arbitrary shape by the following method.

That is, a first method is a method of using a printing method.

In addition, a second method is a method in which vacuum film formation is performed in a state in which a mask having an opening in a pattern shape of a character or an image is superimposed on the reflective layers to form the reflective layers in the pattern shape of the mask.

In addition, in a third method, first, a solvent-soluble resin layer is provided as a negative pattern shape. Next, a reflective layer, which is uniform over the entire surface, is formed to cover the solvent-soluble resin layer, and the solvent-soluble resin layer is dissolved with a solvent and is removed. In addition, the reflective layer that is superimposed on the solvent-soluble resin layer is removed. According to this, remaining reflective layer is formed in an image pattern shape, thereby obtaining the first reflective layer 5 or the second reflective layer 8.

In addition, in a fourth method, first, a resin layer, which is easily peeled off, is provided in a negative pattern shape. Next, a reflective layer, which is uniform over the entire surface, is formed to cover the resin layer, and is compressed to, for example, a sticking roll, sticking paper, and the like to remove the reflective layer by transferring the reflective layer to the sticking roll, the sticking paper, and the like in the negative pattern shape. As a result, the reflective layer remains in an image pattern shape, and thus the first reflective layer 5 or the second reflective layer 8 is obtained.

In addition, in a fifth method, first, a reflective layer, which is uniform over the entire surface, is formed, and a chemical-resistant resin layer is formed on the reflective layer in an image pattern shape. Next, an alkali or acidic etchant is applied to the reflective layer to dissolve and remove an exposed portion of the reflective layer. According to this, the first reflective layer 5 or the second reflective layer 8 is obtained. In this case, the above-described chemical-resistant resin layer may be removed after processing the reflective layer into an image pattern shape, but the chemical-resistant resin layer may be allowed to remain as is so as to use the resin layer as a protective layer provided with chemical resistance.

In addition, in a sixth method, first, a photosensitive resin layer is formed on a reflective layer that is formed uniformly over the entire surface, and is exposed and developed into an image pattern shape. Then, an alkali or acidic etchant is applied so as to dissolve and remove an exposed portion of the reflective layer. According to this, the first reflective layer 5 and the second reflective layer 8 are obtained. Even in this case, the remaining photosensitive resin layer may be allowed to remain so as to use the photosensitive resin layer as a protective layer provided with chemical resistance.

In addition, in a seventh method, first, a reflective layer, which is formed uniformly over the entire surface, is irradiated with laser light so as to directly remove the reflective layer. According to this, the remaining reflective layer has an image pattern shape, and becomes the first reflective layer 5 and the second reflective layer 8.

Furthermore, in the embodiments, a method of forming the first reflective layer 5 and the second reflective layer 8 in a pattern shape, or a method of changing the thickness of the first reflective layer 5 and the second reflective layer 8 are not particularly limited to the above-described method. In addition, the pattern may be a random pattern that does not have explicit meaning. However, for example, information, which is recognized by an observer, may be applied as a pattern such as a picture, a figure, a design, a character, a numeral, and a symbol.

(Printed Layer)

With regard to the printed layer 10, a character and a picture can be formed by using a known method such as an off-set printing method, a gravure printing method, a convex plate printing method, a concave plate printing method, an inkjet printing method, and an indirect transfer method, and a material that is suitable for the respective printing methods.

(Adhesive Layer)

The adhesive layer 9 may be constituted by, for example, a material that adheres to a surface of the substrate 12 to be adhered due to pressure or heat and pressure. A heat-sensitive adhesive material, a heat-sensitive sticking material, and the like, which are known in the related art, may be used.

(Other Layers)

Although not illustrated in the drawings, for example, as other layers, an adhesive auxiliary layer may be provide to enhance adhesiveness between layers, or a colored layer that colors the entirety or a part of a surface may be added. As an application solution of the other layers, for example, an adhesiveness improving agent, an adhesive, a coloring agent using a dye or a pigment, and the like, which are known in the related art, may be used.

[Diffracted-Light Delivery Angle and Intensity Thereof]

Figure 19:
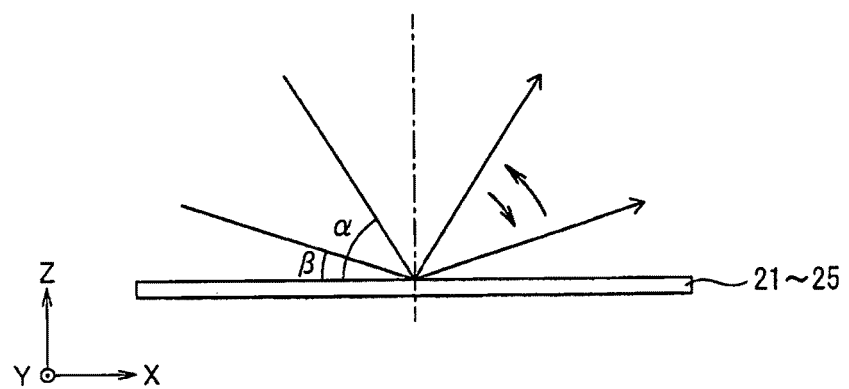
FIG. 19 is a cross-sectional view illustrating a difference in an image that is visually recognized in a case of changing an observation angle for the diffraction structure transfer foil according to the respective embodiments of the invention.
Figure 20A:
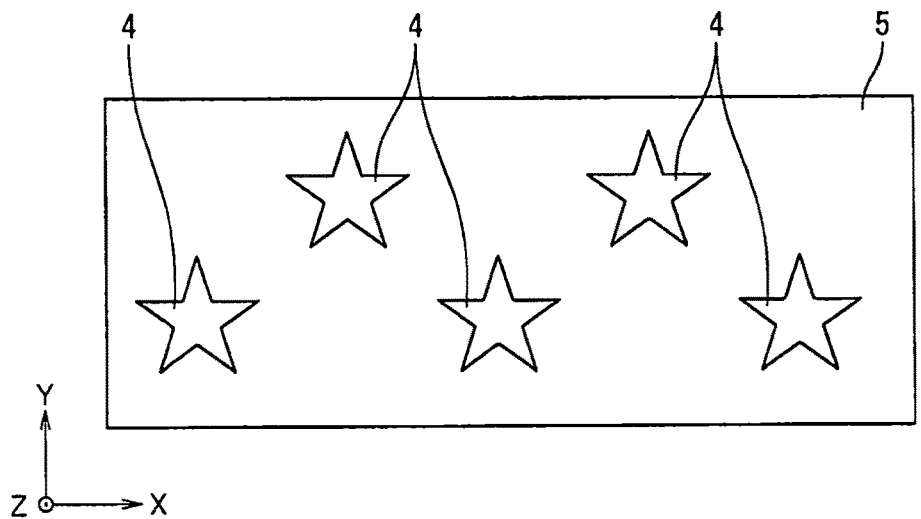
FIGS. 20A and 20B are plan views illustrating a difference in an image that is visually recognized in a case of changing an observation angle for the diffraction structure transfer foil according to the respective embodiments of the invention.
Figure 20B:
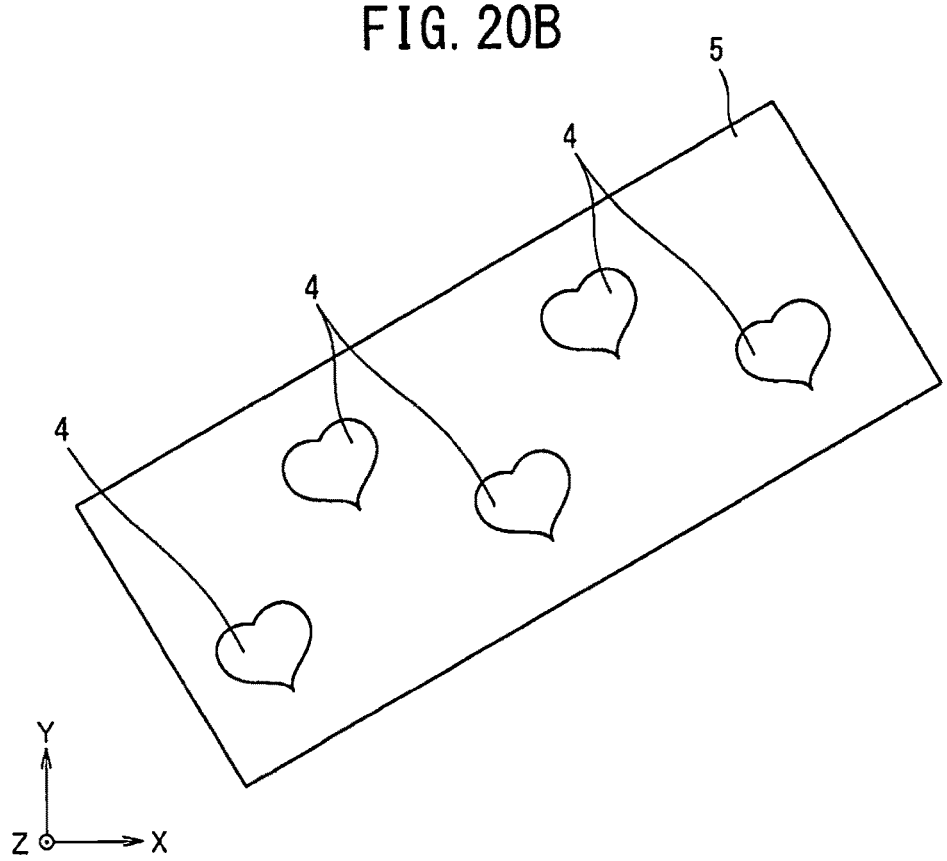

Next, description will be given of a diffracted-light delivery angle and intensity thereof of the diffraction structure transfer foil 21 to the diffraction structure transfer foil 25 mainly with reference to FIG. 19 and FIGS. 20A and 20B. FIG. 19 is a cross-sectional view illustrating a difference between images which are visually recognized in a case of changing an observation angle of the diffraction structure transfer foil 21 to the diffraction structure transfer foil 25 according to the embodiments of the invention. In addition, FIGS. 20A and 20B are plan views illustrating a difference between images which are visually recognized in a case of changing the observation angle of the diffraction structure transfer foil 21 to the diffraction structure transfer foil 25 according to the embodiments of the invention.

First, as illustrated in FIG. 19, in the diffraction structure transfer foil 21 to the diffraction structure transfer foil 25 according to the embodiments, a direction horizontal to the surface of the diffracted-light delivery laminated bodies 13a to 13e is set to 0°, and a direction perpendicular to the surface is set to 90°. In this case, a difference between a diffracted-light delivery angle $\alpha$ of the first diffraction structure forming layer 3 and a diffracted-light delivery angle $\beta$ of the second diffraction structure forming layer 6 of the diffraction structure transfer foil 21 to the diffraction structure transfer foil 25 according to the embodiments is 15° or greater. Furthermore, the diffracted-light delivery angle $\alpha$ may be an angle greater or smaller than the diffracted-light delivery angle $\beta$.

In addition, in a case where a direction horizontal to the surface of the diffracted-light delivery laminated bodies 13a to 13e is set to 0°, and a direction perpendicular to the surface is set to 90°, a diffracted-light delivery angle (for example, the diffracted-light delivery angle $\beta$) of any one of the first diffraction structure forming layer 3 and the second diffraction structure forming layer 6 is in a range of 1° to 45°, and a diffracted-light delivery angle (for example, the diffracted-light delivery angle $\alpha$) of the other diffraction structure forming layer is in a range of 45° to 89°.

In addition, the intensity of diffracted light or reflected light of at least one of the first diffraction structure forming layer 3 and the second diffraction structure forming layer 6 varies when the diffracted-light delivery laminated bodies 13a to 13e are subjected to inplane rotation with respect to the surface of the diffracted-light delivery laminated bodies 13a to 13e. FIGS. 20A and 20B schematically illustrate the following aspect. In a case where the inplane rotation is performed with respect to the surface of the diffracted-light delivery laminated bodies 13a to 13e, the intensity of the diffracted light or the reflected light of at least one of the first diffraction structure forming layer 3 and the second diffraction structure forming layer 6 varies. As a result, a visual effect varies, and the ☆-pattern illustrated in FIG. 11 varies into a heart pattern. More specifically, FIG. 20A illustrates a state before the diffraction structure transfer foil provided with each of the diffracted-light delivery laminated bodies 13a to 13e is subjected to the inplane rotation with respect to the surface of the diffraction structure transfer foil, and a state in which a longitudinal direction of the diffraction structure transfer foil is disposed along an X-axis direction in the drawing. In addition, FIG. 20B illustrates a state after the diffraction structure transfer foil is subjected to the inplane rotation with respect to the surface of the diffraction structure transfer foil, and a state in which the longitudinal direction of the diffraction structure transfer foil is disposed to be inclined from the X-axis direction in the drawing by a predetermined angle.

In addition, a difference between an orientation angle at which the diffracted light of the first diffraction structure forming layer 3 is delivered, and an orientation angle at which the diffracted light of the second diffraction structure forming layer 6 is delivered is 30° or greater.

Furthermore, in the diffraction structure transfer foil 25 according to the fifth embodiment, the "diffracted-light delivery angle $\alpha$ of the first diffraction structure forming layer 3" corresponds to a diffracted-light delivery angle in a first diffraction structure forming portion, in which a first diffraction structure (relief 4) is formed, of the double-sided diffraction structure forming layer 11. In addition, the "diffracted-light delivery angle $\beta$ of the second diffraction structure forming layer 6" corresponds to a diffracted-light delivery angle in a second diffraction structure forming portion, in which a second diffraction structure (relief 7) is formed, of the double-sided diffraction structure forming layer 11.

EXAMPLES

Next, description will be given of Examples which are prepared on the basis of the first embodiment to the seventh embodiment.

Example 1

First, as the support body (transfer foil substrate 1), a transparent polyethylene terephthalate (commonly called PET) film having a thickness of 25 µm was used.

An application solution composed of the following composition was applied to one surface of the support body and was dried to form the peeling-off protective layer 2 having a film thickness of 1.5 µm.

Next, an application solution composed of the following composition was applied to the peeling-off protective layer 2 and was dried to form the first diffraction structure forming layer 3 having a film thickness of 2 µm. Then, the relief plate and the first diffraction structure forming layer 3 were brought into close contact with each other while applying heat and pressure thereto according to a roll embossing method so as to transfer minute concavo-convex structure to the first diffraction structure forming layer 3. According to this, the relief 4 was formed.

Next, an aluminum deposition film was formed on the entirety of the surface, on which the first diffraction structure forming layer 3 including the relief 4 was formed, in a film thickness of 10 nm by using a vacuum deposition method, and was set as the first reflective layer 5. Furthermore, strictly speaking, the film thickness of the aluminum deposition film varies in accordance with a size and a depth of the concavity and convexity of the relief 4 having a minute concavo-convex structure, and the like, and thus a film was also formed on a planar portion in which the relief 4 was not formed. The thickness of the aluminum deposition film at the planar portion was measured, and as a result of the measurement, average value was 10 nm. Accordingly, this value was set as a representative value. Furthermore, with regard to the visible-light transmission density, an aluminum deposition film was formed in advance in a unit of 5 nm in a film thickness range of 5 nm to 100 nm before execution of Example 1, and the visible-light transmission density of each of the aluminum deposition films was measured, and a relationship between the film thickness and the visible-light transmission density was converted into a numerical value. According to the pre-evaluation, when the thickness of the aluminum deposition film was 10 nm, the transmission density was 0.56, and thus the transmission density of the first reflective layer 5 having a film thickness of 10 nm becomes 0.56.

Next, the second diffraction structure forming layer 6 and the relief 7 having a film thickness of 2 μm were formed by using an application solution having the same composition as that of the first diffraction structure forming layer 3, and a processing method with the same sequence. In addition, an aluminum deposition film was formed on the entire surface of the second diffraction structure forming layer 6 in a film thickness of 70 nm by a vacuum deposition method, and was set as the second reflective layer 8. Here, in transmission density measurement performed in advance, when the thickness of the aluminum deposition film was 70 nm, the transmission density was 3.9, and thus the transmission density of the second reflective layer 8 of Example 1 becomes 3.9.

Next, an application solution for the adhesive layer, which was composed of the following composition, was applied to the second diffraction structure forming layer 6 and was dried so as to laminate the adhesive layer 9 having a thickness of 3 μm thereon. According to this, desired diffraction structure transfer foil was manufactured.

"Composition of Application Solution for Peeling-Off Protective Layer"

| Polyamideimide resin | 19.2 parts by weight |
|---|---|
| Polyethylene powder | 0.8 parts by weight |
| Dimethylacetamide | 45.0 parts by weight |
| Toluene | 35.0 parts by weight |

"Composition of Application Solution for Diffraction Structure Forming Layer"

| Urethane resin | 20.0 parts by weight |
|---|---|
| Methyl ethyl ketone | 50.0 parts by weight |
| Ethyl acetate | 30.0 parts by weight |

"Composition of Application Solution for Adhesive Layer"

Vinyl Chloride-Vinyl Acetate Copolymer Resin 15.0 Parts by Weight

| Acrylic resin | 10.0 parts by weight |
|---|---|
| Silica | 1.0 parts by weight |
| Methyl ethyl ketone | 44.0 parts by weight |
| Toluene | 30.0 parts by weight |

Next, a transparent PET film having a thickness of 50 μm was set as the substrate 12 to be transferred, and the diffraction structure transfer foil was superimposed on the film. Then, transferring was performed by using thermal roll transfer machine in which a roll temperature was set to 130° C., and then the transfer foil substrate 1 (support body) was peeled off. According to this, the forgery prevention medium 31 was manufactured. That is, in the forgery prevention medium 31 of Example 1, as illustrated in FIG. 16, each of the first reflective layer 5 and the second reflective layer 8 is entirely formed between layers on upper and lower sides thereof.

According to the forgery prevention medium 31 that was obtained, in a front light state in which light as a light source was located on an upper side or a rear side of an observer, a reflected-light pattern of the relief 7, which was located at a lower layer in comparison to the first reflective layer 5 was not observed due to diffracted light by the relief 4 or reflected light by the first reflective layer 5 in accordance with an observation angle. However, a transmission density of the first reflective layer 5 was 0.98 at an angle at which the diffracted light or the reflected light did not exist. Accordingly, it can be said that the first reflective layer 5 has visible-light transmitting properties. According to this, the diffracted light and the reflected-light pattern due to the relief 7 and the second reflective layer 8 which were located on a lower layer could be observed over the first reflective layer 5 (refer to FIG. 11).

In addition, when observing the forgery prevention medium 31 from a rear surface thereof, the transmission density of the second reflective layer 8 was 3.9 and visible light was hardly transmitted through the second reflective layer 8. Accordingly, reflected light and diffracted light due to the relief 4 and the first reflective layer 5, which were located at a lower layer on a deeper side in comparison to the second reflective layer 8, were not observed in a visual recognition direction, and only diffracted light and reflected light due to the relief 7 and the second reflective layer 8 could be observed.

Example 2

As the support body, a transparent polyethylene terephthalate (commonly called PET) film having a thickness of 25 μm was used.

An application solution composed of the following composition was applied to one surface of the support body and was dried to form the peeling-off protective layer 2 having a film thickness of 1.5 μm.

Next, an application solution composed of the following composition was applied to the peeling-off protective layer 2 and was dried to form the first diffraction structure forming layer 3 having a film thickness of 2 μm. Then, a press plate configured to form a diffraction structure was transferred to the first diffraction structure forming layer 3 through hot pressing by using a roll embossing method to form the relief 4 on a surface.

Next, an aluminum deposition film was formed on the entirety of the surface, on which the first diffraction structure forming layer 3 including the relief 4 was formed, in a film thickness of 14 nm by using a vacuum deposition method, and was set as the first reflective layer 5. Furthermore, strictly speaking, the film thickness of the aluminum deposition film varies in accordance with a size and a depth of the concavity and convexity of the relief 4 having a minute concavo-convex structure, and the like, and thus a film was also formed on a planar portion in which the relief 4 was not formed. The thickness of the aluminum deposition film at the planar portion was measured, and as a result of the measurement, an average value was 14 nm. Accordingly, this value was set as a representative value of the thickness of the aluminum deposition film. Furthermore, with regard to the visible-light transmission density, an aluminum deposition film was formed in advance in a unit of 5 nm in a film thickness range of 5 nm to 100 nm before execution of Example 2, and the visible-light transmission density of each of the aluminum deposition films was measured, and a relationship between the film thickness and the visible-light transmission density was converted into a numerical value. According to the pre-evaluation, when the thickness of the aluminum deposition film was 14 nm, the transmission density was 0.98, and thus the transmission density of the first reflective layer 5 having a film thickness of 14 nm becomes 0.98.

Next, the second diffraction structure forming layer 6 and the relief 7 having a film thickness of 2 μm were formed by using an application solution having the same composition as that of the first diffraction structure forming layer 3, and a processing method with the same sequence. Then, a mask plate having an opening in a character shape of "10000" was prepared, and the mask plate was superimposed on the second diffraction structure forming layer 6, and aluminum deposition processing was performed by a vacuum deposition method to form the second reflective layer 8 including a character pattern of "10000" in a film thickness of 70 nm. Here, in transmission density measurement performed in advance, when the thickness of the aluminum deposition film was 70 nm, the transmission density was 3.9, and thus the transmission density of the second reflective layer 8 of Example 2 becomes 3.9.

Next, an application solution for the adhesive layer, which was composed of the following composition, was applied to the second diffraction structure forming layer 6 and was dried so as to laminate the adhesive layer 9 having a thickness of 3 μm thereon. According to this, desired diffraction structure transfer foil was manufactured.

"Composition of Application Solution for Peeling-Off Protective Layer"

| | |
|---|---|
| Polyamideimide resin | 19.2 parts by weight |
| Polyethylene powder | 0.8 parts by weight |
| Dimethylacetamide | 45.0 parts by weight |
| Toluene | 35.0 parts by weight |

"Composition of Application Solution for Diffraction Structure Forming Layer"

| | |
|---|---|
| Urethane resin | 20.0 parts by weight |
| Methyl ethyl ketone | 50.0 parts by weight |
| Ethyl acetate | 30.0 parts by weight |

"Composition of Application Solution for Adhesive Layer"

Vinyl Chloride-Vinyl Acetate Copolymer Resin 15.0 Parts by Weight

| | |
|---|---|
| Acrylic resin | 10.0 parts by weight |
| Silica | 1.0 parts by weight |
| Methyl ethyl ketone | 44.0 parts by weight |
| Toluene | 30.0 parts by weight |

Next, a transparent PET film having a thickness of 50 μm was set as the substrate 12 to be transferred, and the diffraction structure transfer foil was superimposed on the film. Then, transferring was performed by using thermal roll transfer machine in which a roll temperature was set to 130° C., and then the transfer foil substrate 1 (support body) was peeled off. According to this, the forgery prevention medium 32 was manufactured. That is, in the forgery prevention medium 32 of Example 2, as illustrated in FIG. 17, the first reflective layer 5 is entirely formed between layers on upper and lower sides of the first reflective layer 5, and the second reflective layer 8 was partially formed between layers on upper and lower sides of the second reflective layer 8.

According to the forgery prevention medium 32 that was obtained, even in a front surface and a rear surface, the same reflected light and diffracted-light patterns as in the forgery prevention medium 31 were observed under a front light environment. Furthermore, in the forgery prevention medium 32, when the front surface was lightened with a light source from a rear side under a back light environment, characters of "10000" of the second reflective layer 8 having a transmission density of 3.9 was observed in a black color over the first reflective layer 5 having a transmission density of 0.98.

Example 3

As the support body, a transparent polyethylene terephthalate (commonly called PET) film having a thickness of 25 μm was used.

An application solution composed of the following composition was applied to one surface of the support body and was dried to form the peeling-off protective layer 2 having a film thickness of 1.5 μm.

Next, an application solution composed of the following composition was applied to the peeling-off protective layer 2 and was dried to form the first diffraction structure forming layer 3 having a film thickness of 2 μm. Then, a press plate configured to form a diffraction structure was transferred to the first diffraction structure forming layer 3 through hot pressing by using a roll embossing method to form the relief 4 on a surface.

Next, a mask plate, which partially had an opening in an O-shape or an elliptical shape, was superimposed on a surface on which the first diffraction structure forming layer 3 including the relief 4 was formed in conformity to a position of a ☆-image pattern of the relief 4. Then, aluminum deposition processing was performed by a vacuum deposition method to form the first reflective layer 5 having an O-shape or an elliptical shape in a film thickness of 14 nm. With regard to the film thickness of the aluminum deposition film, a film was also formed on a part of a planar portion in which the relief 4 was not formed, and the thickness of the aluminum deposition film at the planer portion was measured. As a result of the measurement, an average value was 14 nm. According to this, this value was set as a representative value of the thickness of the aluminum deposition film. Furthermore, with regard to the visible-light transmission density, an aluminum deposition film was formed in advance in a unit of 5 nm in a film thickness range of 5 nm to 100 nm before execution of Example 3, and the visible-light transmission density of each of the aluminum deposition films was measured, and a relationship between the film thickness and the visible-light transmission density was converted into a numerical value. According to the pre-evaluation, when the thickness of the aluminum deposition film was 14 nm, the transmission density was 0.98, and thus the transmission density of the first reflective layer 5 having a film thickness of 14 nm becomes 0.98.

Next, the second diffraction structure forming layer 6 having a film thickness of 2 μm was formed by using an application solution having the same composition as that of the first diffraction structure forming layer 3 and a processing method with the same sequence, and the relief 7 having a diffraction structure was formed at a position that overlapped an elliptical pattern in a portion in which the first reflective layer 5 was formed. Then, a mask plate having an opening in a character shape of "10000" was superimposed on the second diffraction structure forming layer 6, and aluminum deposition processing was performed by a vacuum deposition method to form the second reflective layer 8 including a character pattern of "10000" in a film thickness of 70 nm. Here, in transmission density measurement performed in advance, when the thickness of the aluminum deposition film was 70 nm, the transmission density was 3.9, and thus the transmission density of the second reflective layer 8 of Example 3 becomes 3.9.

Next, an application solution for the adhesive layer, which was composed of the following composition, was applied to the second diffraction structure forming layer 6 and was dried so as to laminate the adhesive layer 9 having a thickness of 3 μm thereon. According to this, desired diffraction structure transfer foil was manufactured.

"Composition of Application Solution for Peeling-Off Protective Layer"

| | |
|---|---|
| Polyamideimide resin | 19.2 parts by weight |
| Polyethylene powder | 0.8 parts by weight |
| Dimethylacetamide | 45.0 parts by weight |
| Toluene | 35.0 parts by weight |

"Composition of Application Solution for Diffraction Structure Forming Layer"

| | |
|---|---|
| Urethane resin | 20.0 parts by weight |
| Methyl ethyl ketone | 50.0 parts by weight |
| Ethyl acetate | 30.0 parts by weight |

"Composition of Application Solution for Adhesive Layer"

Vinyl Chloride-Vinyl Acetate Copolymer Resin 15.0 Parts by Weight

| | |
|---|---|
| Acrylic resin | 10.0 parts by weight |
| Silica | 1.0 parts by weight |
| Methyl ethyl ketone | 44.0 parts by weight |
| Toluene | 30.0 parts by weight |

Next, a transparent PET film having a thickness of 50 μm was set as the substrate 12 to be transferred, and the diffraction structure transfer foil was superimposed on the film. Then, transferring was performed by using thermal roll transfer machine in which a roll temperature was set to 130° C., and then the transfer foil substrate 1 (support body) was peeled off. According to this, the forgery prevention medium 33 was manufactured. That is, in the forgery prevention medium 33 of Example 3, as illustrated in FIG. 15, each of the first reflective layer 5 and the second reflective layer 8 was partially formed between layers on upper and lower sides thereof.

According to the forgery prevention medium 33 that was obtained, even in a front surface and a rear surface, the same reflected light and diffracted-light patterns as in the forgery prevention media 31 and 32 prepared in Example 1 and Example 2 were observed under a front light environment. Furthermore, in the forgery prevention medium 33, when the front surface was lightened with a light source from a rear side under a back light environment, characters of "10000" of the second reflective layer 8 having a transmission density of 3.9 was observed in a black color over the first reflective layer 5 having an elliptical shape and a transmission density of 0.98. In addition, when lightening the forgery prevention medium 33, it was observed that positions of three patterns of the relief 7, the second reflective layer 8, and the first reflective layer 5 match each other. According to this, it could be seen that the forgery prevention medium was capable of easily making an authenticity determination on an advanced forgery prevention technology.

As described above, it could be seen that a forgery prevention medium prepared by using the diffraction structure transfer foil according to the embodiment and the examples of the invention is a medium capable of easily making an authenticity determination while having an optical variation that was not provided in the related art.

Hereinbefore, the invention has been described with reference to specific embodiments, but the description is not intended to limit the invention. When referring to the description of the invention, it should be understood by those skilled in the art that other embodiments of the invention are possible in combination with embodiments which are disclosed. Accordingly, it should be understood that claims include modification examples and embodiments which are included in the scope and the gist of the invention.

As described above in the embodiments and the examples, according to the diffraction structure transfer foil according to an aspect of the invention and the forgery prevention medium using the same, it is possible to solve the technical problem. Hereinafter, description will be given of details of the technical problem.

In the related art, as forgery prevention means, means for making forgery of an article itself difficult, and means capable of determining authenticity by attaching a member, of which forgery is difficult, to an article as a certification of a genuine article are disclosed. For example, similar to paper money and securities such as a stock certificate, the former makes forgery with a printing technology and a forgery with a copier and a scanner difficult by performing minute printing processing or water mark processing with respect to the paper money and the securities, by using coloration with a color tone of which color reproduction is difficult, or by using a specific raw material.

However, it is possible to easily reproduce minute printing processing and a color, of which forgery was difficult in the related art, with a color copier, a scanner, and the like due to advance in a digital technology. As a result, as a forger prevention countermeasure, further higher miniaturization of printing processing is in progress so as to make duplication and forgery difficult. However, when the high miniaturization is developed, it is difficult to make an authenticity determination at first glance, and thus authenticity determination is not easy.

Accordingly, a diffraction structure, on which a diffraction lattice pattern is recorded, has been widely used as the forgery prevention means from the viewpoints that it is possible to determine authenticity at first glance by attaching the diffraction structure to an article (forgery prevention article), and handling thereof is also easy. Examples of the diffraction structure that is employed as the forgery prevention means include a diffraction structure that is configured as transfer foil by sequentially laminating a detachable peeling-off layer, a diffraction structure forming layer in which a diffraction lattice is formed, a reflective layer having metallic glossy, and an adhesive layer on a substrate (for example, refer to PTL 1).

In addition, there is also disclosed a diffraction structure in which a transparent metallic deposition thin film or a thin film of an inorganic compound is formed in a reflective layer as a transparent diffraction lattice so as to allow a member, which is located on a lower side in comparison to the reflective layer, to be observed with the naked eye through the diffraction lattice (for example, refer to PTL 2).

However, the diffraction structure, which has been used in the related art, has a configuration in which when light is incident to a diffraction structure forming layer formed on one surface of the diffraction structure, diffracted light is generated, the diffracted light is reflected from a reflective layer and is transmitted through a layer, and the diffracted light is observed on a light incident side. In the diffraction structure, even when an opposite surface is lightened, light is shielded by an opaque substrate of the diffraction structure. In addition, even when the substrate is transparent, the reflective layer is located in front of the diffraction structure forming layer (substrate side), and thus the diffracted light is not observed. As a result, the diffracted light may be observed only on one surface side of the diffraction structure. That is, the authenticity determination method includes only confirmation of the diffracted-light pattern, and thus there is a problem that forgery by a pattern that resembles the diffracted light is easy.

In addition, there is also disclosed a diffraction structure in which a plurality of the diffraction structure forming layers are provided, and thus the same figure or a separate figure are reproducible in a different reproduction direction, and a plurality of figures are reproducible in an overlapping manner (for example, refer to PTL 3).

However, in PTL 3, the plurality of diffraction structure forming layers are laminated, but the diffracted light may be observed only from one surface of the diffraction structure in some cases. According to this, as described above, the authenticity determination method includes only confirmation of the diffracted-light pattern, and thus there is a problem that forgery by a pattern that resembles the diffracted light is easy.

Effect of Embodiments (1) In comparison to diffraction structure transfer foil according to the related art in which the problem is present, the diffraction structure transfer foil 21 to the diffraction structure transfer foil 25 according to an aspect of the invention include a transfer foil substrate 1, a peeling-off protective layer 2 that is laminated on one surface of the transfer foil substrate 1, each of diffracted-light delivery laminated bodies 13a to 13e each being laminated on the peeling-off protective layer 2, and an adhesive layer 9 that is laminated on each of the diffracted-light delivery laminated bodies 13a to 13e. In addition, each of the diffracted-light delivery laminated bodies 13a to 13e includes a diffraction structure forming body in which relieves 4 and 7 are formed, and each of reflective layers 5 and 8 which are formed in accordance with each of the relieves 4 and 7. In addition, a transmission density of at least one reflective layer 5 in the reflective layers 5 and 8 is in a range of 0.01 to 0.9, and a transmission density of another reflective layer 8 other than the one reflective layer 5 is 1.0 or greater.

According to the configuration, the transmission density of at least one reflective layer 5 is in a range of 0.01 to 0.9 and transmission properties are provided, and the transmission density of another reflective layer 8 other than the one reflective layer 5 is 1.0 or greater and hardly has transmission properties. As described above, when using two reflective layers 5 and 8 different in transmission properties, it is possible to deliver a greater variety of diffracted-light patterns to an outer side from the diffraction structure transfer foil 21 to the diffraction structure transfer foil 25. More specifically, for example, in a case of a combination of the first diffraction structure forming layer 3, and the first reflective layer 5 (5a to 5d), when a difference in a transmission density exists in a plane, at a site at which a transmission density is low, it is possible to visually recognize diffracted light or reflected light due to the second diffraction structure forming layer 6 and the second reflective layer 8 (8a to 8d). However, at a site at which a transmission density is high, transmitted light is shielded, and thus it is difficult visually recognize diffracted light or reflected light due to the second diffraction structure forming layer 6. On the other hand, in a case of a combination of the first diffraction structure forming layer 3 and the first reflective layer 5 (5a to 5d), when a difference in a transmission density does not exist in a plane, a transmission density is low and is approximately constant. Accordingly, visibility of diffracted light or reflected light due to the second diffraction structure forming layer 6 and the second reflective layer 8 (8a to 8d) which are located at a lower layer is enhanced.

Accordingly, the greater variety of diffracted-light patterns can be observed, and thus usefulness of the diffraction structure transfer foil 21 to the diffraction structure transfer foil 25 in authenticity determination is further improved. In addition, it is possible to grasp characteristics of a high visual effect provided to the relieves 4 and 7 with a sense of vision of human beings without a variation in the visual effect, and it is possible to easily make an authenticity determination.

(2) In addition, the diffraction structure forming body may include a first diffraction structure forming layer 3 in which the relief 4 is formed, and a second diffraction structure forming layer 6 in which the relief 7 is formed. The laminated body for diffracted-light delivery 13a may include a first reflective layer 5a that is formed in accordance with the relief 4, and a second reflective layer 8a that is formed in accordance with the relief 7. The first diffraction structure forming layer 3, the first reflective layer 5a, the second diffraction structure forming layer 6, and the second reflective layer 8a may be laminated in this order from a transfer foil substrate 1 side.

According to the configuration, in the laminated body for diffracted-light delivery 13a, since the first diffraction structure forming layer 3, the first reflective layer 5a, the second diffraction structure forming layer 6, and the second reflective layer 8a are laminated in this order from the transfer foil substrate 1 side, the relief 4 is provided on an adhesive layer 9 side of the first diffraction structure forming layer 3, and the relief 7 is provided on an adhesive layer 9 side of the second diffraction structure forming layer 6.

Accordingly, it is possible to make forgery of the diffraction structure transfer foil more difficult.

(3) A printed layer 10 including a character or an image pattern may be provided between the first reflective layer 5a and the second diffraction structure forming layer 6.

According to the configuration, since the printed layer 10 including a character or an image pattern is provided between the first reflective layer 5a and the second diffraction structure forming layer 6, it is possible to observe the diffraction structure transfer foil 22 by using the printed layer 10. More specifically, it is possible read a constant angle range under front light, or a pattern of the printed layer 10 under back light, and the pattern of the printed layer 10 can be allowed not to be observed from an adhesive layer 9 side.

(4) In addition, the diffraction structure forming body may include the first diffraction structure forming layer 3 in which the relief 4 is formed, and the second diffraction structure forming layer 6 in which the relief 7 is formed. The laminated body for diffracted-light delivery 13b may include the first reflective layer 5b that is formed in accordance with the relief 4, and the second reflective layer 8a that is formed in accordance with the relief 7. The first reflective layer 5b, the first diffraction structure forming layer 3, the second diffraction structure forming layer 6, and the second reflective layer 8a may be laminated in this order from the transfer foil substrate 1 side.

According to the configuration, since the first reflective layer 5b, the first diffraction structure forming layer 3, the second diffraction structure forming layer 6, and the second reflective layer 8a are laminated in this order from a transfer foil substrate 1 side, the relief 4 is provided on a transfer foil substrate 1 side of the first diffraction structure forming layer 3, and the relief 7 is provided on an adhesive layer 9 side of the second diffraction structure forming layer 6.

Accordingly, it is possible to make forgery of the diffraction structure transfer foil more difficult.

(5) In addition, the printed layer 10 including a character or an image pattern may be provided between the first diffraction structure forming layer 3 and the second diffraction structure forming layer 6.

According to the configuration, since the printed layer 10 including a character or an image pattern is provided between the first diffraction structure forming layer 3 and the second diffraction structure forming layer 6, it is possible to observe the diffraction structure transfer foil 24 by using the printed layer 10. More specifically, it is possible read a constant angle range under front light, or a pattern of the printed layer 10 under back light, and the pattern of the printed layer 10 may be allowed not to be observed from an adhesive layer 9 side.

(6) In addition, in a case where a direction horizontal to the surface of the diffracted-light delivery laminated bodies 13a to 13e is set to 0°, and a direction perpendicular to the surface is set to 90°, a difference between a diffracted-light delivery angle α of the first diffraction structure forming layer 3 and a diffracted-light delivery angle β of the second diffraction structure forming layer 6 may be set to 15° or greater.

According to the configuration, overlapping of diffracted light of the first diffraction structure forming layer 3 and diffracted light of the second diffraction structure forming layer 6 is reduced, and thus authenticity determination with a sense of vision becomes easy.

(7) In addition, in a case where a direction horizontal to the surface of the diffracted-light delivery laminated bodies 13a to 13e is set to 0°, and a direction perpendicular to the surface is set to 90°, a diffracted-light delivery angle (for example, the diffracted-light delivery angle β) of any one of the first diffraction structure forming layer 3 and the second diffraction structure forming layer 6 may be set in a range of 1° to 45°, and a diffracted-light delivery angle (for example, the diffracted-light delivery angle α) of the other diffraction structure forming layer may be set in a range of 45° to 89°.

According to the configuration, overlapping of diffracted light of the first diffraction structure forming layer 3 and diffracted light of the second diffraction structure forming layer 6 is reduced, and thus authenticity determination with a sense of vision becomes easy.

(8) Intensity of diffracted light or reflected light of any one of the first diffraction structure forming layer 3 and the second diffraction structure forming layer 6 may be allowed to vary according to inplane rotation of the diffracted-light delivery laminated bodies 13a to 13e with respect to the surface of the diffracted-light delivery laminated bodies 13a to 13e.

According to the configuration, overlapping of diffracted light of the first diffraction structure forming layer 3 and diffracted light of the second diffraction structure forming layer 6 is reduced, and thus authenticity determination with a sense of vision becomes easy.

(9) Intensity of diffracted light or reflected light of both of the first diffraction structure forming layer 3 and the second diffraction structure forming layer 6 may be allowed to vary according to inplane rotation of the diffracted-light delivery laminated bodies 13a to 13e with respect to the surface of the diffracted-light delivery laminated bodies 13a to 13e. In addition, in a case where a direction horizontal to the surface of the diffracted-light delivery laminated bodies 13a to 13e is set to 0°, and a direction perpendicular to the surface is set to 90°, a difference between an orientation angle at which the diffracted light of the first diffraction structure forming layer 3 is delivered, and an orientation angle at which the diffracted light of the second diffraction structure forming layer 6 is delivered may be set to 30° or greater.

According to the configuration, overlapping of diffracted light and reflected light of the first diffraction structure forming layer 3 and the second diffraction structure forming layer 6 is reduced, and thus authenticity determination with a sense of vision becomes easy.

(10) In addition, the diffraction structure forming body may be a double-sided diffraction structure forming layer 11 in which the relief 4 is formed in a surface on a transfer foil substrate 1 side, and the relief 7 is formed in a surface on an adhesive layer 9 side. The laminated body for diffracted-light delivery 13c may include a first reflective layer 5c that is formed in accordance with the relief 4, and a second reflective layer 8c1 that is formed in accordance with the relief 7, and the first reflective layer 5c, the double-sided diffraction structure forming layer 11, and the second reflective layer 8c1 may be laminated in this order from the transfer foil substrate 1 side.

According to the configuration, since the first reflective layer 5c, the double-sided diffraction structure forming layer 11, and the second reflective layer 8c1 are laminated in this order form the transfer foil substrate 1 side, the first diffraction structure forming layer 3 and the second diffraction structure forming layer 6 are integrally formed. As described above, the first diffraction structure forming layer 3 and the second diffraction structure forming layer 6 are integrally formed, it is possible to realize a reduction in size of the diffraction structure transfer foil, that is, it is possible to reduce the thickness of the diffraction structure transfer foil.

(11) In addition, in a case where a direction horizontal to a surface of the laminated body for diffracted-light delivery 13c is set to 0° and a direction perpendicular to the surface is set to 90°, a difference between a diffracted-light delivery angle in a first diffraction structure forming portion, in which the first diffraction structure is formed, of the double-sided diffraction structure forming layer 11, and a diffracted-light delivery angle in a second diffraction structure forming portion, in which the second diffraction structure is formed, of the double-sided diffraction structure forming layer 11 may be set to 15° or greater.

According to the configuration, overlapping of diffracted light of the first diffraction structure forming portion and diffracted light of the second diffraction structure forming portion is reduced, and thus authenticity determination with a sense of vision becomes easy.

(12) In addition, in a case where the direction horizontal to the surface of the laminated body for diffracted-light delivery 13c is set to 0° and the direction perpendicular to the surface is set to 90°, the diffracted-light delivery angle of any one of the first diffraction structure forming portion and the second diffraction structure forming portion may be set in a range of 1° to 45°, and the diffracted-light delivery angle of the other diffraction structure forming portion may be set in a range of 45° to 89°.

According to the configuration, overlapping of diffracted light of the first diffraction structure forming portion and diffracted light of the second diffraction structure forming portion is reduced, and thus authenticity determination with a sense of vision becomes easy.

(13) In addition, intensity of diffracted light or reflected light in any one of the first diffraction structure forming portion and the second diffraction structure forming portion may be allowed to vary according to inplane rotation of the laminated body for diffracted-light delivery 13c with respect to a surface of the laminated body for diffracted-light delivery 13c.

According to the configuration, overlapping of diffracted light of the first diffraction structure forming portion and diffracted light of the second diffraction structure forming portion is reduced, and thus authenticity determination with a sense of vision becomes easy.

(14) Intensity of diffracted light or reflected light both of the first diffraction structure forming portion and the second diffraction structure forming portion may be allowed to vary according to inplane rotation of the laminated body for diffracted-light delivery 13c with respect to a surface of the laminated body for diffracted-light delivery 13c. In addition, in a case where the direction horizontal to the surface of the laminated body for diffracted-light delivery 13c is set to 0° and the direction perpendicular to the surface is set to 90°, a difference between an orientation angle at which diffracted light is delivered in the first diffraction structure forming portion and an orientation angle at which diffracted light is delivered in the second diffraction structure forming portion may be set to 30° or greater.

According to the configuration, overlapping of diffracted light and reflected light at the first diffraction structure forming portion and the second diffraction structure forming portion is reduced, and thus authenticity determination with a sense of vision becomes easy.

(15) In addition, among the first reflective layers 5a to 5d and the second reflective layers 8a to 8d, the reflective layers 5a to 5d (or 8a to 8d) at least on one side may be partially provided between two layers with each of the reflective layers 5a to 5d (8a to 8d) on one side interposed therebetween (at an interface therebetween).

According to the configuration, since among the first reflective layers 5a to 5d and the second reflective layers 8a to 8d, the reflective layers 5a to 5d (or 8a to 8d) at least on one side is partially provided between two layers with each of the reflective layers 5a to 5d (8a to 8d) on one side interposed therebetween (at an interface therebetween), it is possible to obtain a greater variety of diffracted-light patterns. According to this, it is possible to make forgery of the diffraction structure transfer foil more difficult.

(16) In addition, each of the first reflective layers 5a to 5d, and each of the second reflective layers 8a to 8d may be formed in an arrangement in which at least parts thereof overlap in a lamination direction.

According to the configuration, since each of the first reflective layers 5a to 5d and each of the second reflective layers 8a to 8d are formed in an arrangement in which at least parts thereof overlap each other in the lamination direction, it is possible to obtain a greater variety of diffracted-light patterns. According to this, it is possible to make forgery of the diffraction structure transfer foil more difficult.

(17) In addition, the relief 4 and the relief 7 may be formed in an arrangement in which at least parts thereof overlap each other in the lamination direction.

According to the configuration, since the relief 4 and the relief 7 are formed in an arrangement in which at least parts thereof overlap each other in the lamination direction, it is possible to obtain a greater variety of diffracted-light patterns. According to this, it is possible to make forgery of the diffraction structure transfer foil more difficult.

(18) In addition, the forgery prevention media 31 to 33 according to another aspect of the invention include the diffraction structure transfer foil 21 to the diffraction structure transfer foil 25, each being attached to a substrate 12 to be transferred of which at least a part is transparent.

According to the configuration, since at least a part of each of the diffraction structure transfer foil 21 to the diffraction structure transfer foil 25 is attached to the substrate 12 to be transferred of which apart is transparent, the forgery prevention media 31 to 33 can be observed from both surfaces. According to this, it is possible to make forgery of the diffraction structure transfer foil more difficult.

As described above, according to the diffraction structure transfer foil 21 to the diffraction structure transfer foil 25 according to one aspect of the invention, it is possible to realize the forgery prevention media 31 to 33 using a complicated structure and optical characteristics which are controlled with accuracy, and particularly, it is possible to observe an optical variation different between a front surface and a rear surface of the forgery prevention media 31 to 33 during authenticity determination, and it is possible to observe a character or a figure pattern that is different from the optical variation between the front and rear surfaces trough lightening with transmitted light. Accordingly, the diffraction structure transfer foil 21 to the diffraction structure transfer foil 25 according to one aspect of the invention realize the authenticity determination with transmitted light in addition to reflected light and diffracted light, and makes forgery more difficult through a combination of a complicated and minute structure and accurate optical characteristics.

REFERENCE SIGNS LIST

1: transfer foil substrate
2: peeling-off protective layer

3: first diffraction structure forming layer
4: relief
5, 5a, 5b, 5c, 5d: first reflective layer
6: second diffraction structure forming layer
7: relief
8, 8a, 8b, 8c1, 8c2, 8d: second reflective layer
9: adhesive layer
10: printed layer
11: double-sided diffraction structure forming layer
12: substrate to be transferred
13a, 13b, 13c, 13d, 13e: laminated body for diffracted-light delivery
21, 22, 23, 24, 25: diffraction structure transfer foil
31, 32, 33: forgery prevention medium

The invention claimed is:

1. Diffraction structure transfer foil, comprising:
    a support body;
    a peeling-off protective layer that is laminated on one surface of the support body;
    a laminated body for diffracted-light delivery that is laminated on the peeling-off protective layer; and
    an adhesive layer that is laminated on the laminated body for diffracted-light delivery,
    wherein the laminated body for diffracted-light delivery includes a diffraction structure forming body in which a plurality of diffraction structures are formed, and a reflective layer that is formed in accordance with each of the plurality of diffraction structures, and
    a transmission density of at least one reflective layer of a plurality of the reflective layers is in a range of 0.01 to 0.9, and a transmission density of another reflective layer other than the one reflective layer is 1.0 or greater.

2. The diffraction structure transfer foil according to claim 1,
    wherein the plurality of diffraction structures includes a first diffraction structure and a second diffraction structure,
    the diffraction structure forming body includes a first diffraction structure forming layer in which the first diffraction structure is formed, and a second diffraction structure forming layer in which the second diffraction structure is formed,
    the laminated body for diffracted-light delivery includes a first reflective layer that is formed in accordance with the first diffraction structure, and a second reflective layer that is formed in accordance with the second diffraction structure, and
    the first diffraction structure forming layer, the first reflective layer, the second diffraction structure forming layer, and the second reflective layer are laminated in this order from a support body side.

3. The diffraction structure transfer foil according to claim 2,
    wherein a printed layer including a character or an image pattern is provided between the first reflective layer and the second diffraction structure forming layer.

4. The diffraction structure transfer foil according to claim 1,
    wherein the plurality of diffraction structures includes a first diffraction structure and a second diffraction structure,
    the diffraction structure forming body includes a first diffraction structure forming layer in which the first diffraction structure is formed, and a second diffraction structure forming layer in which the second diffraction structure is formed,
    the laminated body for diffracted-light delivery includes a first reflective layer that is formed in accordance with the first diffraction structure, and a second reflective layer that is formed in accordance with the second diffraction structure, and
    the first reflective layer, the first diffraction structure forming layer, the second diffraction structure forming layer, and the second reflective layer are laminated in this order from a support body side.

5. The diffraction structure transfer foil according to claim 4,
    wherein a printed layer including a character or an image pattern is provided between the first diffraction structure forming layer and the second diffraction structure forming layer.

6. The diffraction structure transfer foil according to claim 2,
    wherein a difference between a diffracted-light delivery angle of the first diffraction structure forming layer and a diffracted-light delivery angle of the second diffraction structure forming layer is 15° or greater.

7. The diffraction structure transfer foil according to claim 6,
    wherein the diffracted-light delivery angle of any one of the first diffraction structure forming layer and the second diffraction structure forming layer is in a range of 1° to 45°, and the diffracted-light delivery angle of the other diffraction structure forming layer is in a range of 45° to 89°.

8. The diffraction structure transfer foil according to claim 2,
    wherein intensity of diffracted light or reflected light of any one of the first diffraction structure forming layer and the second diffraction structure forming layer varies when the laminated body for diffracted-light delivery is subjected to inplane rotation with respect to a surface of the laminated body for diffracted-light delivery.

9. The diffraction structure transfer foil according to claim 2,
    wherein intensity of diffracted light or reflected light of both of the first diffraction structure forming layer and the second diffraction structure forming layer varies when the laminated body for diffracted-light delivery is subjected to inplane rotation with respect to a surface of the laminated body for diffracted-light delivery, and
    a difference between an orientation angle at which the diffracted light of the first diffraction structure forming layer is delivered, and an orientation angle at which the diffracted light of the second diffraction structure forming layer is delivered is 30° or greater.

10. The diffraction structure transfer foil according to claim 1,
    wherein the plurality of diffraction structures includes a first diffraction structure and a second diffraction structure,
    the diffraction structure forming body is a double-sided diffraction structure forming layer in which the first diffraction structure is formed in a surface on a support body side, and the second diffraction structure is formed in a surface on an adhesive layer side,
    the laminated body for diffracted-light delivery includes a first reflective layer that is formed in accordance with the first diffraction structure, and a second reflective layer that is formed in accordance with the second diffraction structure, and the first reflective layer, the double-sided diffraction structure forming layer, and the second reflective layer are laminated in this order from the support body side.

11. The diffraction structure transfer foil according to claim 10,
wherein in a case where a direction horizontal to a surface of the laminated body for diffracted-light delivery is set to 0° and a direction perpendicular to the surface is set to 90°, a difference between a diffracted-light delivery angle in a first diffraction structure forming portion, in which the first diffraction structure is formed, of the double-sided diffraction structure forming layer, and a diffracted-light delivery angle in a second diffraction structure forming portion, in which the second diffraction structure is formed, of the double-sided diffraction structure forming layer is 15° or greater.

12. The diffraction structure transfer foil according to claim 11,
wherein the diffracted-light delivery angle of any one of the first diffraction structure forming portion and the second diffraction structure forming portion is in a range of 1° to 45°, and the diffracted-light delivery angle of the other diffraction structure forming portion is in a range of 45° to 89°.

13. The diffraction structure transfer foil according to claim 10,
wherein intensity of diffracted light or reflected light of any one of a first diffraction structure forming portion, in which the first diffraction structure is formed, of the double-sided diffraction structure forming layer, and a second diffraction structure forming portion, in which the second diffraction structure is formed, of the double-sided diffraction structure forming layer varies when the laminated body for diffracted-light delivery is subjected to inplane rotation with respect to a surface of the laminated body for diffracted-light delivery.

14. The diffraction structure transfer foil according to claim 10,
wherein intensity of diffracted light or reflected light of both of a first diffraction structure forming portion, in which the first diffraction structure is formed, of the double-sided diffraction structure forming layer, and a second diffraction structure forming portion, in which the second diffraction structure is formed, of the double-sided diffraction structure forming layer varies when the laminated body for diffracted-light delivery is subjected to inplane rotation with respect to a surface of the laminated body for diffracted-light delivery, and
a difference between an orientation angle at which diffracted light is delivered in the first diffraction structure forming portion and an orientation angle at which diffracted light is delivered in the second diffraction structure forming portion is 30° or greater.

15. The diffraction structure transfer foil according to claim 2,
wherein at least one reflective layer of the first reflective layer and the second reflective layer is partially provided between two layers with the one reflective layer interposed therebetween.

16. The diffraction structure transfer foil according to claim 15,
wherein the first reflective layer and the second reflective layer are formed in an arrangement in which at least parts of the first reflective layer and the second reflective layer overlap each other in a lamination direction.

17. The diffraction structure transfer foil according to claim 15,
wherein the first diffraction structure and the second diffraction structure are formed in an arrangement in which at least parts of the first diffraction structure and the second diffraction structure overlap each other in a lamination direction.

18. A forgery prevention medium, comprising:
the diffraction structure transfer foil according to claim 1,
wherein the diffraction structure transfer foil is attached to a substrate to be transferred of which at least a part is transparent.

* * * * *